US012780185B2

(12) United States Patent
Yuan et al.

(10) Patent No.: US 12,780,185 B2
(45) Date of Patent: Nov. 3, 2026

(54) AUTOMATED PARKING METHOD, APPARATUS, AND SYSTEM

(71) Applicant: Yinwang Intelligent Technologies Co., Ltd., Shenzhen (CN)

(72) Inventors: Fang Yuan, Shenzhen (CN); Pin Nie, Shenzhen (CN); Jinbo Li, Shanghai (CN)

(73) Assignee: YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 161 days.

(21) Appl. No.: 18/383,957

(22) Filed: Oct. 26, 2023

(65) Prior Publication Data

US 2024/0051527 A1 Feb. 15, 2024

Related U.S. Application Data

(63) Continuation of application No. PCT/CN2021/090318, filed on Apr. 27, 2021.

(51) Int. Cl.
*B60W 30/09* (2012.01)
*B60W 30/06* (2006.01)
(Continued)

(52) U.S. Cl.
CPC ........... *B60W 30/09* (2013.01); *B60W 30/06* (2013.01); *B60W 30/0956* (2013.01);
(Continued)

(58) Field of Classification Search
CPC .. B60W 30/06; B60W 30/09; B60W 30/0956; B60W 40/04; B60W 60/0027;
(Continued)

(56) References Cited

U.S. PATENT DOCUMENTS

| | | | | |
|---|---|---|---|---|
| 8,996,224 | B1 * | 3/2015 | Herbach | B60W 60/0011 701/25 |
| 9,227,632 | B1 * | 1/2016 | Lee | B60W 30/0956 |

(Continued)

FOREIGN PATENT DOCUMENTS

| | | | |
|---|---|---|---|
| CN | 107703945 | A | 2/2018 |
| CN | 110045730 | A | 7/2019 |

(Continued)

*Primary Examiner* — Peter D Nolan
*Assistant Examiner* — Ce Li Li
(74) *Attorney, Agent, or Firm* — WOMBLE BOND DICKINSON (US) LLP

(57) ABSTRACT

This application provides an automated parking method, apparatus, and system, and is related to the automated driving field. According to the solution provided in this application, an initial driving path and a bypass path can be planned for a vehicle. Therefore, the vehicle does not need to plan a driving path, and further, a large quantity of high-precision sensors do not need to be disposed in the vehicle, thereby effectively reducing costs of the vehicle. In addition, compared with that in a manner in which a vehicle plans a path while performing detection, in the solution provided in this application, a road traffic status in an entire parking domain can be determined, and further, a global initial driving path can be planned for the vehicle, thereby effectively improving path planning efficiency. In addition, a bypass path may be further planned and delivered in advance when an obstacle is detected.

19 Claims, 22 Drawing Sheets

(51) Int. Cl.
*B60W 30/095* (2012.01)
*G06V 20/54* (2022.01)

(52) U.S. Cl.
CPC ......... *G06V 20/54* (2022.01); *B60W 2554/80* (2020.02); *B60W 2556/50* (2020.02)

(58) Field of Classification Search
CPC ....... B60W 2554/402; B60W 2554/80; B60W 2556/45; B60W 2556/50; B62D 15/0285; G06V 20/54; G08G 1/04; G08G 1/096816; G08G 1/096844; G08G 1/143; G08G 1/146; G08G 1/163; G08G 1/166; G08G 1/168
See application file for complete search history.

(56) References Cited

U.S. PATENT DOCUMENTS

| | | | | |
|---|---|---|---|---|
| 9,229,453 | B1 * | 1/2016 | Lee | B60W 30/12 |
| 2015/0073661 | A1 * | 3/2015 | Raisch | B62D 15/027<br>701/41 |
| 2017/0351267 | A1 | 12/2017 | Mielenz | |
| 2020/0070818 | A1 * | 3/2020 | Tominaga | B60W 10/20 |
| 2020/0183388 | A1 * | 6/2020 | Yoon | G05D 1/0212 |
| 2021/0245735 | A1 * | 8/2021 | Wang | G08G 1/143 |
| 2021/0262808 | A1 * | 8/2021 | Wang | G01C 21/32 |
| 2022/0258733 | A1 * | 8/2022 | Konishi | G06V 20/58 |

FOREIGN PATENT DOCUMENTS

| | | | |
|---|---|---|---|
| CN | 110246354 | A | 9/2019 |
| CN | 110782696 | A | 2/2020 |
| CN | 111223322 | A | 6/2020 |
| CN | 111319615 | A | 6/2020 |
| CN | 111352426 | A | 6/2020 |
| CN | 112558617 | A | 3/2021 |
| CN | 112700668 | A | 4/2021 |
| DE | 102018212998 | A1 | 2/2020 |

* cited by examiner

AUTOMATED PARKING METHOD, APPARATUS, AND SYSTEM

CROSS-REFERENCE TO RELATED APPLICATIONS

This application is a continuation of International Application No. PCT/CN2021/090318, filed on Apr. 27, 2021, the disclosure of which is hereby incorporated by reference in its entirety.

TECHNICAL FIELD

This application relates to the automated driving field, furthermore, to an automated parking method, apparatus, and system.

BACKGROUND

With rapid development of intelligent connected vehicle technologies, more vehicles begin to support an automated valet parking (AVP) function. For a vehicle having the AVP function, a driver needs only to park the vehicle outside a parking lot. Then, the vehicle can automatically drive into the parking lot to find a parking space and park the vehicle in the proper parking space.

To implement the AVP function, a large quantity of sensors, such as millimeter-wave radars, lidars, and cameras, need to be installed on the vehicle. In an automated parking process of the vehicle, a computing unit in the vehicle may perform fusion processing on signals detected by sensors, to determine a road driving status around the vehicle, and then control driving of the vehicle based on the determined road driving status.

However, in the foregoing solution, a large quantity of sensors need to be installed on the vehicle, and a high-performance computing unit needs to be configured in the vehicle. This leads to high costs of the vehicle. In addition, the vehicle needs to plan a path while detecting a surrounding environment in a driving process. Consequently, path planning efficiency is low, and further parking efficiency is low. In particular, this is especially true when an automated driving vehicle encounters an obstacle in a process of performing AVP.

SUMMARY

This application provides an automated parking method, apparatus, and system, to resolve a problem that vehicle costs are high because a vehicle plans a path.

According to one aspect, an automated parking method is provided, applied to a parking domain. The method includes: determining, in the parking domain based on the road traffic status in the parking domain, an initial location of a target vehicle, and a location of a target parking space of the target vehicle, an initial driving path from the initial location to the target parking space; sending the initial driving path to the target vehicle, where the initial driving path indicates the target vehicle to drive from the initial location to the target parking space; if it is detected that there is an obstacle on the initial driving path, determining a bypass path based on an obstacle area in which the obstacle is located; and sending the bypass path to the target vehicle, where the bypass path does not overlap the obstacle area, and the bypass path indicates the target vehicle to bypass the obstacle.

The parking domain can plan the initial driving path and the bypass path for the vehicle. Therefore, the vehicle does not need to plan a driving path, and further, a large quantity of high-precision sensors do not need to be disposed in the vehicle, thereby effectively reducing costs of the vehicle. In addition, the bypass path may be further planned and delivered in advance when the obstacle is detected. Therefore, it can be ensured that the vehicle can bypass the obstacle in a timely manner, to reach the target parking space, thereby effectively improving a parking success rate.

In some embodiments, a process of the determining a bypass path based on an obstacle area in which the obstacle is located may include: separately determining a start point, an end point, and at least one intermediate point of the bypass path based on the obstacle area, where both the start point and the end point are located on the initial driving path, both a shortest distance between the start point and the obstacle area and a shortest distance between the end point and the obstacle area are greater than or equal to a first distance threshold, each intermediate point is located outside the initial driving path, a shortest distance between each intermediate point and the obstacle area is greater than or equal to a second distance threshold, and a shortest distance between each intermediate point and an edge of a road on which the obstacle is located is greater than or equal to a third distance threshold.

By enabling each point on the bypass path to meet the foregoing distance requirement, it can be ensured that a sufficient safe distance is reserved for the target vehicle to bypass.

In some embodiments, the at least one intermediate point may include a first intermediate point and a second intermediate point. A connection line between the first intermediate point and a first vertex of the obstacle area is parallel to a width direction of the road, and a connection line between the second intermediate point and a second vertex of the obstacle area is parallel to the width direction of the road. The first vertex is a vertex that is closest to the start point of the bypass path and that is in the obstacle area, and the second vertex is a vertex that is closest to the end point of the bypass path and that is in the obstacle area.

Two intermediate points are determined between the start point and the end point of the bypass path, so that inflection points of the bypass path can be minimized while it is ensured that the target vehicle reliably bypasses the obstacle, to reduce a quantity of times that the target vehicle adjusts a vehicle posture.

In some embodiments, the process of the determining a bypass path based on an obstacle area in which the obstacle is located may further include: performing filtering processing on a track formed by sequentially connecting the start point, the at least one intermediate point, and the end point, to obtain the bypass path. Therefore, it can be ensured that the bypass path is smooth, thereby ensuring that the target vehicle drives more smoothly.

In some embodiments, the second distance threshold may be greater than or equal to $W/2$, and the third distance threshold may be greater than or equal to $(W/2+d)$, where $W$ is a width of the target vehicle, and $d$ is a safe distance threshold. Setting of the distance thresholds can ensure that sufficient safe distances are reserved between the bypass path and the edge of the road and between the bypass path and the obstacle area, for the target vehicle to drive.

In some embodiments, before the determining a bypass path based on an obstacle area in which the obstacle is located, the method may further include: determining an initial area occupied by the obstacle on the road; and determining the obstacle area based on the initial area, where the initial area is located within the obstacle area, a distance between a target boundary of the obstacle area and a target boundary of the initial area is greater than or equal to the safe distance threshold, and the bypass path is located on a side that is of the target boundary of the obstacle area and that is away from the target boundary of the initial area.

The distance between the obstacle area and the initial area that is occupied by the obstacle is greater than or equal to the safe distance threshold. Therefore, it can be ensured that a sufficient safe distance can also be reserved between the bypass path planned based on the obstacle area and the initial area, that is, reliability of the bypass path planned based on the obstacle area is high.

In some embodiments, a shortest distance between the initial area and a first edge of the road is greater than a shortest distance between the initial area and a second edge of the road, and the bypass path is located between the target boundary of the obstacle area and the first edge. The bypass path is planned on a side with a larger distance between the initial area and a road edge, so that it can be ensured that the target vehicle can reliably bypass the obstacle.

In some embodiments, a plurality of visual sensors are disposed in the parking domain; and a process of the determining an initial area occupied by the obstacle on the road may include: determining, based on an image that includes the obstacle and that is captured by at least one visual sensor, the initial area occupied by the obstacle on the road.

The visual sensor may be further reused as a monitoring camera in the parking domain. Therefore, using the visual sensor as a sensor for detecting the obstacle can effectively reduce costs of an automated parking system. In addition, reliability of detecting the obstacle by using the image captured by the visual sensor is also high.

In some embodiments, a process of the determining, based on an image that includes the obstacle and that is captured by at least one visual sensor, the initial area occupied by the obstacle on the road may include: obtaining a first image that includes the obstacle and that is captured by a first visual sensor, and a second image that includes the obstacle and that is captured by a second visual sensor, where the first visual sensor and the second visual sensor are arranged in an extension direction of the road, and are separately located on two sides of the obstacle; determining, based on the first image, a first detection box that includes the obstacle, and determining, based on the second image, a second detection box that includes the obstacle; and determining, based on coordinates of the first detection box in a pixel coordinate system, coordinates of the second detection box in the pixel coordinate system, and a conversion relationship between the pixel coordinate system and a world coordinate system, the initial area occupied by the obstacle on the road.

In a scenario in which an obstacle is high, a field of view of a single visual sensor may be blocked by the obstacle. Consequently, a complete boundary of the obstacle cannot be detected. Therefore, an initial area occupied by an obstacle may be determined based on images captured by two visual sensors, to ensure reliability of the determined initial area, and further ensure reliability of a planned bypass path.

In some embodiments, both the first detection box and the second detection box are rectangular detection boxes. A process of the determining, based on coordinates of the first detection box in a pixel coordinate system, coordinates of the second detection box in the pixel coordinate system, and a conversion relationship between the pixel coordinate system and a world coordinate system, the initial area occupied by the obstacle on the road may include: determining, based on coordinates of a first vertex and a second vertex of the first detection box in the pixel coordinate system and the conversion relationship between the pixel coordinate system and the world coordinate system, a first locating point and a second locating point that respectively correspond to the first vertex and the second vertex of the first detection box and that are in the world coordinate system; determining, based on coordinates of a first vertex and a second vertex of the second detection box in the pixel coordinate system and the conversion relationship between the pixel coordinate system and the world coordinate system, a third locating point and a fourth locating point that respectively correspond to the first vertex and the second vertex of the second detection box and that are in the world coordinate system; and determining, based on the first locating point, the second locating point, the third locating point, and the fourth locating point, the initial area occupied by the obstacle on the road, where the first vertex and the second vertex of the first detection box are two vertices that are in four vertices of the first detection box and that are close to the road, and the first vertex and the second vertex of the second detection box are two vertices that are in four vertices of the second detection box and that are close to the road.

According to the method provided in this application, the conversion relationship between the pixel coordinate system and the world coordinate system may be pre-calibrated, to ensure that world coordinates of each locating point in the initial area can be quickly and accurately determined based on the pixel coordinates of each vertex of the detection box in the image.

In some embodiments, a process of the determining, based on the first locating point, the second locating point, the third locating point, and the fourth locating point, the initial area occupied by the obstacle on the road may include: if a distance between the first locating point and the fourth locating point is greater than a fourth distance threshold, and a distance between the second locating point and the third locating point is greater than the fourth distance threshold, determining, as the initial area, a rectangular area enclosed by sequentially connecting the first locating point, the second locating point, the third locating point, and the fourth locating point; or if a distance between the first locating point and the fourth locating point is less than or equal to a fourth distance threshold, and a distance between the second locating point and the third locating point is less than or equal to the fourth distance threshold, determining a fifth locating point and a sixth locating point based on the first locating point and the second locating point, and determining, as the initial area, an area enclosed by sequentially connecting the first locating point, the fifth locating point, the second locating point, and the sixth locating point. A first coordinate of the fifth locating point is equal to a first coordinate of the first locating point, a second coordinate of the fifth locating point is equal to a second coordinate of the second locating point, a first coordinate of the sixth locating point is equal to a first coordinate of the second locating point, and a second coordinate of the sixth locating point is equal to a second coordinate of the first locating point. Both a connection line between the first locating point and the fifth locating point and a connection line between the second locating point and the sixth locating point in the initial area are straight lines, both a connection line between the first locating point and the sixth locating point and a connection line between the second locating point and the fifth locating point are arcs, and a circle center of the arc is a center point of a rectangle that uses the first locating point, the second locating point, the fifth locating point, and the sixth locating point as vertices. A coordinate axis of the first coordinate is parallel to the width direction of the road. A coordinate axis of the second coordinate is perpendicular to the coordinate axis of the first coordinate, and is parallel to the extension direction of the road.

According to the method provided in this application, the initial area may be determined in different manners based on different postures or different shapes of the obstacle, to ensure reliability of the determined initial area.

In some embodiments, a process of the sending the bypass path to the target vehicle may include: sending the bypass path to the target vehicle before a distance between the target vehicle and the start point of the bypass path is less than a fifth distance threshold.

The bypass path is delivered in advance, so that it can be ensured that the target vehicle has sufficient time to adjust a vehicle posture, thereby ensuring that the target vehicle can smoothly bypass the obstacle.

In some embodiments, before the determining an initial driving path, the method may further include: determining the target parking space based on a parking space occupation status in the parking domain.

According to the method provided in this application, the target parking space used for parking the target vehicle can be determined in advance based on the parking space occupation status. Compared with that of a blind parking space finding solution, parking efficiency is effectively improved.

In some embodiments, the method may further include: sending the bypass path to a mobile terminal associated with the target vehicle.

The mobile terminal may be a mobile terminal of a vehicle owner of the target vehicle. The bypass path is sent to the mobile terminal, so that it can be ensured that the vehicle owner learns, in a timely manner, that the target vehicle is bypassing.

In some embodiments, a process of the sending the initial driving path to the target vehicle may include: sending the initial driving path to the target vehicle through a first communication link between a management cloud platform and the target vehicle; or if the first communication link is faulty, sending the initial driving path to the target vehicle through a second communication link between a lot server and the target vehicle. The process of the sending the bypass path to the target vehicle may include: sending the bypass path to the target vehicle through the first communication link between the management cloud platform and the target vehicle; or if the first communication link is faulty, sending the bypass path to the target vehicle through the second communication link between the lot server and the target vehicle.

According to the method provided in this application, when the first communication link is faulty, the initial driving path and the bypass path may be sent through the standby second communication link, thereby ensuring reliable path delivery.

According to another aspect, an automated parking apparatus is provided, applied to a parking domain. The apparatus includes at least one module, and the at least one module may be configured to implement the automated parking method provided in the foregoing aspect.

According to still another aspect, an automated parking apparatus is provided, applied to a parking domain. The apparatus includes a memory, a processor, and a computer program that is stored in the memory and that can be run on the processor. When the processor executes the computer program, the automated parking method provided in the foregoing aspect is implemented.

According to yet another aspect, a computer-readable storage medium is provided. The computer-readable storage medium stores instructions. When the instructions are run on a processor, the processor is enabled to perform the automated parking method provided in the foregoing aspect.

According to still yet another aspect, a computer program product including instructions is provided. When the computer program product runs on a computer, the computer is enabled to perform the automated parking method provided in the foregoing aspect.

According to further another aspect, an automated parking system is provided. The automated parking system includes a plurality of sensors disposed in a parking domain and the automated parking apparatus provided in the foregoing aspects.

In conclusion, embodiments of this application provide an automated parking method, apparatus, and system. The automated parking apparatus in the parking domain can plan the initial driving path and the bypass path for the vehicle. Therefore, the vehicle does not need to plan a driving path, and further, a large quantity of high-precision sensors do not need to be disposed in the vehicle, thereby effectively reducing costs of the vehicle. In addition, compared with a vehicle that plans a path while performing detection, the automated parking apparatus can determine a road traffic status in the entire parking domain, and can further plan a global initial driving path for the vehicle, so that path planning efficiency is effectively improved, and parking efficiency is further improved.

In addition, when detecting an obstacle, the automated parking apparatus may further plan and deliver a bypass path in advance. Therefore, it can be ensured that the vehicle can bypass the obstacle in a timely manner, to reach a target parking space, thereby effectively improving a parking success rate.

DESCRIPTION OF EMBODIMENTS

To make the objectives, technical solutions, and advantages of this application clearer, the following further describes the embodiments of this application in detail with reference to the accompanying drawings.

Figure 1:
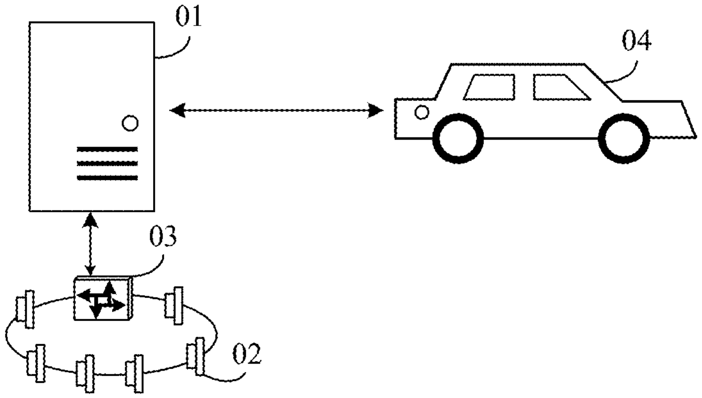
FIG. 1 is a schematic diagram of a structure of an automated parking system according to an embodiment of this application.

FIG. 1 is a schematic diagram of an automated parking system according to an embodiment of this application. The automated parking system may be applied to a parking domain. The parking domain may be a place with a temporary parking space, for example, a parking lot in a place like a shopping mall, a station, or an airport. Alternatively, the parking domain may be a place with a fixed parking space, for example, a garage in a community. As shown in FIG. 1, the automated parking system includes an automated parking apparatus 01 and a plurality of sensors 02. The automated parking apparatus 01 may be a server, or may be a server cluster including several servers, or may be a cloud computing center (also referred to as a cloud platform), or may include a cloud platform and at least one server. The plurality of sensors 02 may be deployed in the parking domain, and the plurality of sensors 02 may include at least one of a visual sensor and a radar. The visual sensor may be a camera, for example, a monocular camera or a binocular camera. The radar may be a millimeter-wave radar, a lidar, an ultrasonic radar, or the like.

As shown in FIG. 1, communication connections are established between the automated parking apparatus 01 and the plurality of sensors 02. The automated parking apparatus 01 may obtain data collected by the plurality of sensors 02. For example, refer FIG. 1. The automated parking system may further include a forwarding device 03. The forwarding device 03 is separately connected to the automated parking apparatus 01 and the plurality of sensors 02. The forwarding device 03 can forward the data collected by the plurality of sensors 02 to the automated parking apparatus 01. The forwarding device 03 may be a device having a data forwarding function, for example, a router or a switch.

In this embodiment of this application, the automated parking apparatus 01 may determine a road traffic status and a parking space occupation status in the parking domain based on the data collected by the plurality of sensors 02, and may further plan an initial driving path for a target vehicle 04 that needs to park in the parking domain. In addition, the automated parking apparatus 01 delivers the initial driving path to the target vehicle 04, so that the target vehicle 04 can drive to a target parking space based on the initial driving path. In addition, when detecting that there is an obstacle on the initial driving path, the automated parking apparatus 01 may further plan and deliver a bypass path, so that the target vehicle 04 can bypass the obstacle.

It may be understood that the target vehicle 04 may be a vehicle having at least a semi-automated driving (namely, L2-level automated driving) function. For example, the target vehicle 04 may be a vehicle having an AVP function. In addition, the target vehicle 04 may be a new energy vehicle (for example, a pure electric vehicle, a hybrid electric vehicle, a plug-in hybrid electric vehicle, or a fuel cell vehicle), a fuel vehicle, or the like.

Figure 2:
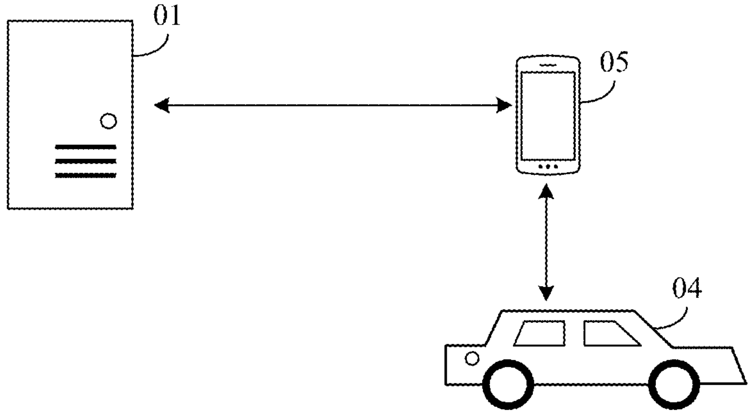
FIG. 2 is a schematic diagram of a structure of another automated parking system according to an embodiment of this application.

In some embodiments, as shown in FIG. 1, the automated parking apparatus 01 may directly deliver the initial driving path and the bypass path to the target vehicle 04. Alternatively, as shown in FIG. 2, the automated parking apparatus 01 may deliver the initial driving path and the bypass path to a mobile terminal 05 associated with the target vehicle 04, and then the mobile terminal 05 forwards the path to the target vehicle 04. The mobile terminal 05 may be a mobile phone, a notebook computer, a tablet computer, or the like. That the mobile terminal 05 is associated with the target vehicle 04 means the following: The mobile terminal 05 may establish a communication connection, for example, a Bluetooth connection, to the target vehicle 04; or a platform like a vehicle cloud platform records a binding relationship between the mobile terminal 05 and the target vehicle 04, and the mobile terminal 05 and the target vehicle 04 may communicate with each other by using the platform.

In a possible example, the automated parking apparatus 01 may be a management cloud platform deployed in a cloud. The management cloud platform may directly obtain the data collected by the plurality of sensors 02 in the parking domain, and plan the initial driving path and the bypass path for the target vehicle 04 based on the obtained data.

Figure 3:
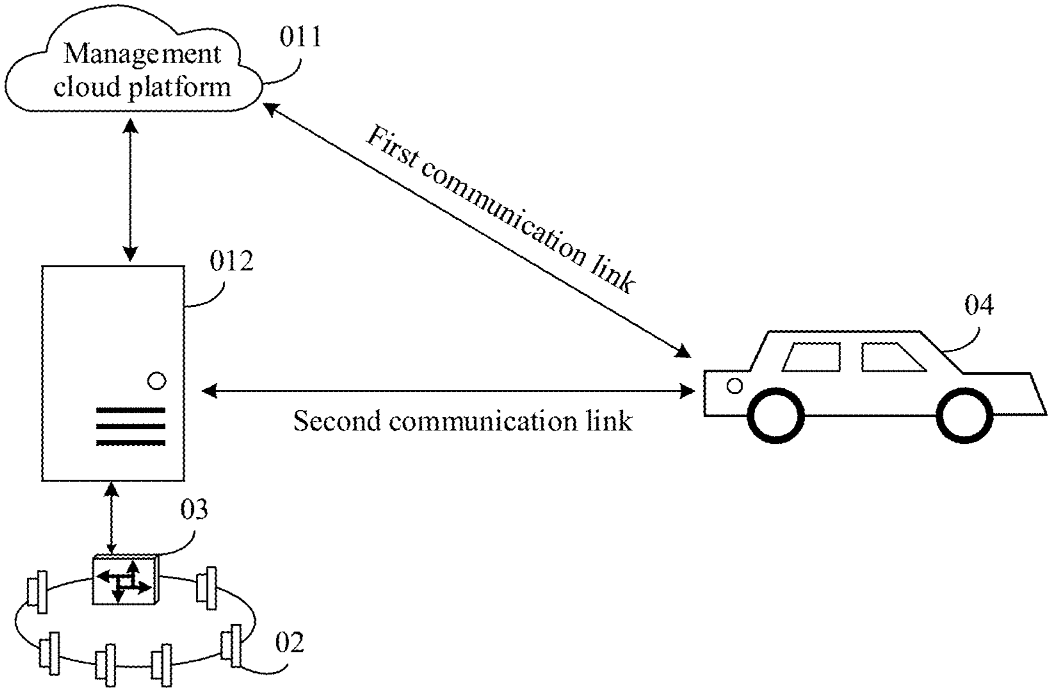
FIG. 3 is a schematic diagram of a structure of still another automated parking system according to an embodiment of this application.

In another possible example, as shown in FIG. 3, the automated parking apparatus 01 may include a management cloud platform 011 deployed in the cloud, and a lot server 012 (which may also be referred to as an edge server) deployed in the parking domain. The lot server 012 separately establishes communication connections to the management cloud platform 011 and the plurality of sensors 02. The lot server 012 may obtain the data collected by the plurality of sensors 02, perform preliminary processing (for example, determining an obstacle area in which the obstacle is located, and/or determining a road topology of the parking domain) on the data, and then upload processed data to the management cloud platform 011. The management cloud platform 011 may plan the initial driving path and the bypass path for the target vehicle 04 based on the data uploaded by the lot server 012. The lot server 012 deployed in the parking domain performs preliminary processing on the data collected by the sensors 02, so that a data processing delay can be effectively reduced.

In still another possible example, as shown in FIG. 2, the automated parking apparatus 01 may be a lot server deployed in the parking domain. The lot server may be one server, or may be a server cluster including several servers. The lot server may directly obtain the data collected by the plurality of sensors 02 in the parking domain, and plan the initial driving path and the bypass path for the target vehicle 04 based on the obtained data.

According to the solution provided in this application, the automated parking apparatus can plan the initial driving path and the bypass path for the vehicle. Therefore, the vehicle does not need to plan a driving path, and further, a large quantity of high-precision sensors do not need to be disposed in the vehicle, thereby effectively reducing costs of the vehicle. In addition, compared with a vehicle that plans a path while performing detection, the automated parking apparatus can determine a road traffic status in the entire parking domain, and can further plan an initial driving path for the vehicle, so that path planning efficiency is effectively improved, and parking efficiency is further improved. In addition, when detecting an obstacle, the automated parking apparatus may further plan and deliver a bypass path in advance. Therefore, it can be ensured that the vehicle can bypass the obstacle in a timely manner, to reach a target parking space, thereby effectively improving a parking success rate.

Figure 4:
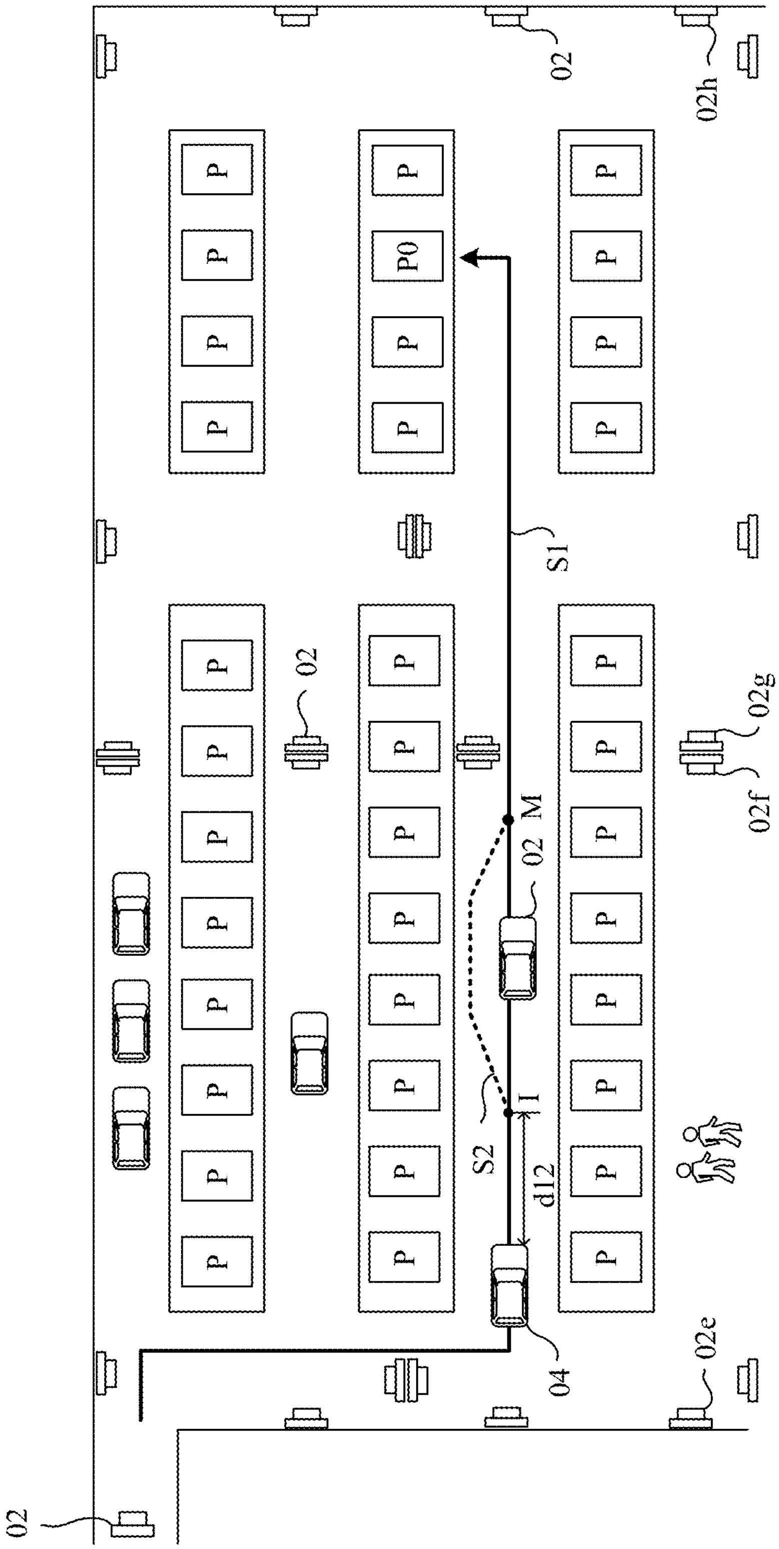
FIG. 4 is a top view of a parking domain according to an embodiment of this application.

The following describes a deployment manner of the sensor 02 by using an example in which the sensor 02 disposed in the parking domain is a visual sensor. FIG. 4 is a top view of a parking domain according to an embodiment of this application. As shown in FIG. 4, at least one visual sensor 02 may be disposed above each road in the parking domain. In other words, the plurality of visual sensors 02 may cover all roads in the parking domain, to ensure that a traffic status of each road in the parking domain can be monitored in real time.

Figure 5:
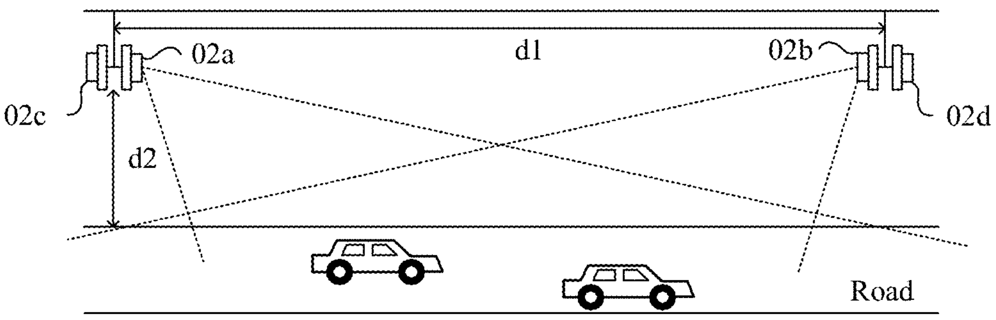
FIG. 5 is a side view of a deployment scenario of a visual sensor according to an embodiment of this application.

FIG. 5 is a side view of a deployment scenario of a visual sensor according to an embodiment of this application. In FIG. 5, an example in which the visual sensor is a monocular camera is used for illustration. Refer to FIG. 5. Two adjacent visual sensors may be disposed opposite to each other, that is, lens orientation directions of the two visual sensors 02 may be opposite to each other. For example, in FIG. 5, a visual sensor 02*a* and a visual sensor 02*b* are disposed opposite to each other; and in FIG. 4, a visual sensor 02*e* and a visual sensor 02*f* are disposed opposite to each other, and a visual sensor 02*g* and a visual sensor 02*h* are also disposed opposite to each other. In addition, if field of view ranges of two adjacent visual sensors (for example, 02*a* and 02*b* in FIG. 5, 02*e* and 02*f* in FIG. 4, and 02*g* and 02*h* in FIG. 4) cover a same road segment, a spacing d1 between the two visual sensors may be large. If field of view ranges of two adjacent visual sensors (for example, 02*a* and 02*c* in FIG. 5, or 02*b* and 02*d* in FIG. 5) cover different road segments, the two visual sensors may be disposed adjacent to each other. For example, the two visual sensors may be fixed at a same location.

A projection of a field of view range of each visual sensor on the ground may be a sector, and a radius of the sector may be greater than or equal to the spacing d1 between two adjacent visual sensors. In this way, a monitoring blind spot can be avoided, and all-round monitoring on each road in the parking domain is ensured. Refer to FIG. 4. It can be further seen that a height of each visual sensor from the ground may be d2. A value range of the spacing d1 may be 15 meters (m) to 25 m. For example, the spacing d1 may be 20 m. The height d2 may be greater than or equal to 2.5 m. A radius of a field of view range of each visual sensor may be greater than d1. For example, the radius may be 60 m.

The visual sensor may be further reused as a monitoring camera in the parking domain. Therefore, using the visual sensor as a sensor for detecting the road traffic status and the obstacle can effectively reduce costs of an automated parking system. In addition, because both a lidar and a millimeter-wave radar need to detect a location of an object based on a signal reflected by the object, detection precision is affected by a material of the object. However, detection precision of the visual sensor is not affected by a material of an object. Therefore, reliability of detecting the road traffic status and the obstacle by using the image captured by the visual sensor is high.

It may be understood that the image captured by the visual sensor is a two-dimensional image, but the automated parking apparatus 01 needs to perform path planning based on location information in a physical world. Therefore, pixel coordinates in the two-dimensional image need to be converted into world coordinates in a world coordinate system. In this embodiment of this application, the automated parking apparatus 01 (for example, the lot server) may pre-calibrate, based on a correspondence between a pixel coordinate system and the world coordinate system, an image captured by each visual sensor 02, to obtain a correspondence between pixel coordinates of each point in the image and world coordinates of each point in the parking domain. Calibration precision may be at a pixel level. To be specific, the automated parking apparatus 01 may obtain world coordinates of a locating point that corresponds to each pixel in the image and that is in the parking domain. In addition, in the correspondence that is between the pixel coordinates and the world coordinates and that is obtained by the automated parking apparatus 01 through calibration, precision of the world coordinates can be less than 5 centimeters (cm). In this way, the automated parking apparatus 01 can implement centimeter-level path planning.

Figure 6:
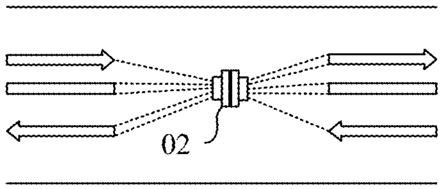
FIG. 6 is a partial top view of a road in a parking domain according to an embodiment of this application.

For example, FIG. 6 is a partial top view of a road in a parking domain according to an embodiment of this application. Refer to FIG. 6. A plurality of road surface sign lines are drawn on the road in the parking domain. The automated parking apparatus 01 may obtain a correspondence between world coordinates of each vertex of each road surface sign line and pixel coordinates of a point in the image by calibrating the image captured by the visual sensor 02.

Figure 7:
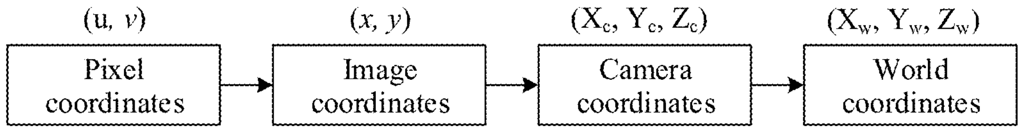
FIG. 7 is a schematic diagram of a coordinate conversion process according to an embodiment of this application.

The following describes a process of calibrating the image. Refer to FIG. 7. During coordinate conversion, pixel coordinates need to be first converted into image coordinates. Then, the image coordinates are converted into camera coordinates. Finally, the camera coordinates are converted into world coordinates.

Figure 8:
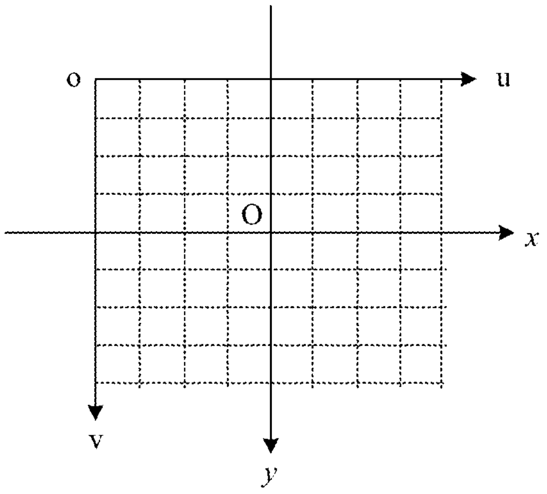
FIG. 8 is a schematic diagram of a conversion relationship between a pixel coordinate system and an image coordinate system according to an embodiment of this application.

FIG. 8 is a schematic diagram of a conversion relationship between a pixel coordinate system and an image coordinate system according to an embodiment of this application. As shown in FIG. 8, the pixel coordinate system includes a u-axis and a v-axis, and an origin is o. The image coordinate system includes an x-axis and a y-axis, an origin is O, and pixel coordinates of the origin O in the pixel coordinate system are (u0, v0). It is assumed that physical sizes of each pixel in the pixel coordinate system on the x-axis and the y-axis are respectively dx and dy. In this case, a conversion relationship between pixel coordinates (u, v) in the pixel coordinate system and image coordinates (x, y) in the image coordinate system may be obtained as follows:

$$\begin{bmatrix} u \\ v \\ 1 \end{bmatrix} = \begin{bmatrix} \frac{1}{dx} & 0 & u0 \\ 0 & \frac{1}{dy} & v0 \\ 0 & 0 & 1 \end{bmatrix} \begin{bmatrix} x \\ y \\ 1 \end{bmatrix}. \quad \text{Formula (1)}$$

Figure 9:
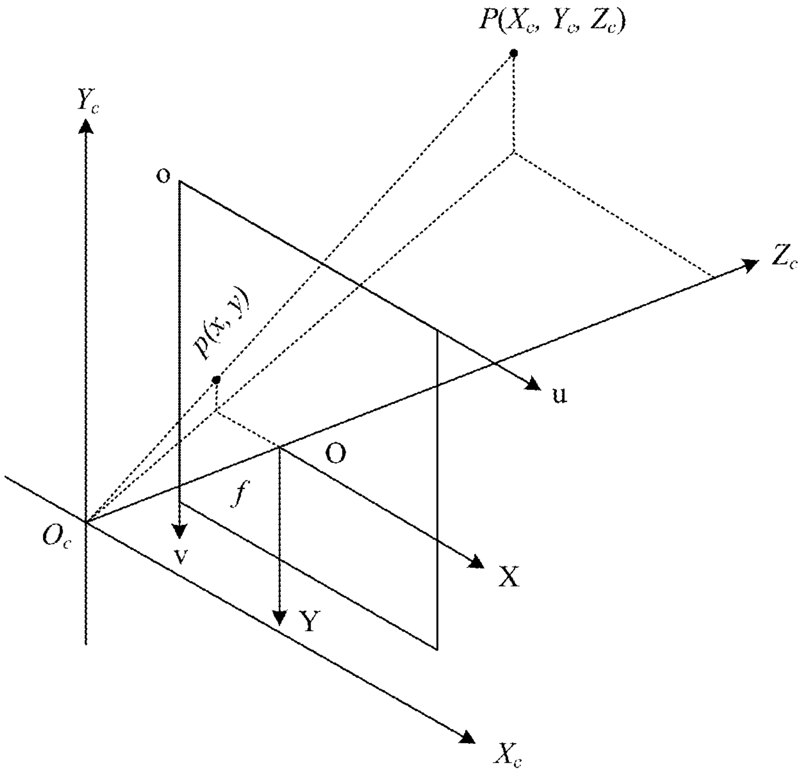
FIG. 9 is a schematic diagram of a conversion relationship between an image coordinate system and a camera coordinate system according to an embodiment of this application.

FIG. 9 is a schematic diagram of a conversion relationship between an image coordinate system and a camera coordinate system according to an embodiment of this application. As shown in FIG. 9, it can be learned based on a pinhole imaging principle that, a conversion relationship between camera coordinates (Xc, Yc, Zc) of any point P in space in the camera coordinate system and image coordinates (x, y) of a point p that corresponds to the point P and that is in the image coordinate system is as follows:

$$\begin{bmatrix} x \\ y \\ 1 \end{bmatrix} = \begin{bmatrix} \frac{f}{Zc} & 0 & u0 & 0 \\ 0 & \frac{f}{Zc} & v0 & 0 \\ 0 & 0 & \frac{1}{Zc} & 0 \end{bmatrix} \begin{bmatrix} Xc \\ Yc \\ Zc \\ 1 \end{bmatrix}. \quad \text{Formula (2)}$$

In Formula (2), f is a focal length of a camera, namely, a distance between an origin Oc of the camera coordinate system and the origin O of the image coordinate system in FIG. 9.

Further, a conversion relationship between camera coordinates (Xc, Yc, Zc) in the camera coordinate system and world coordinates (Xw, Yw, Zw) in the world coordinate system is as follows:

$$\begin{bmatrix} Xc \\ Yc \\ Zc \\ 1 \end{bmatrix} = \begin{bmatrix} R & t \\ 0 & 1 \end{bmatrix} \begin{bmatrix} Xw \\ Yw \\ Zw \\ 1 \end{bmatrix}. \quad \text{Formula (3)}$$

In Formula (3), R is a rotation matrix, and t is a translation matrix. With reference to Formula (1) to Formula (3), a conversion relationship between the pixel coordinates (u, v) and the world coordinates (Xw, Yw, Zw) may be obtained as follows:

$$\begin{bmatrix} u \\ v \\ 1 \end{bmatrix} = \begin{bmatrix} \frac{1}{dx} & 0 & u0 \\ 0 & \frac{1}{dy} & v0 \\ 0 & 0 & 1 \end{bmatrix} \begin{bmatrix} \frac{f}{Zc} & 0 & u0 & 0 \\ 0 & \frac{f}{Zc} & v0 & 0 \\ 0 & 0 & \frac{1}{Zc} & 0 \end{bmatrix} \begin{bmatrix} R & t \\ 0 & 1 \end{bmatrix} \begin{bmatrix} Xw \\ Yw \\ Zw \\ 1 \end{bmatrix} = \quad \text{Formula (4)}$$

$$M_1 M_2 \begin{bmatrix} Xw \\ Yw \\ Zw \\ 1 \end{bmatrix} = M \begin{bmatrix} Xw \\ Yw \\ Zw \\ 1 \end{bmatrix}.$$

In Formula (4), $M_1$ is referred to as a camera intrinsic parameter, $M_2$ is referred to as a camera extrinsic parameter, and M is a parameter matrix of the camera. In this embodiment of this application, the automated parking apparatus 01 may calibrate, based on the conversion relationship shown in Formula (4), the image captured by each visual sensor 02.

Figure 10:
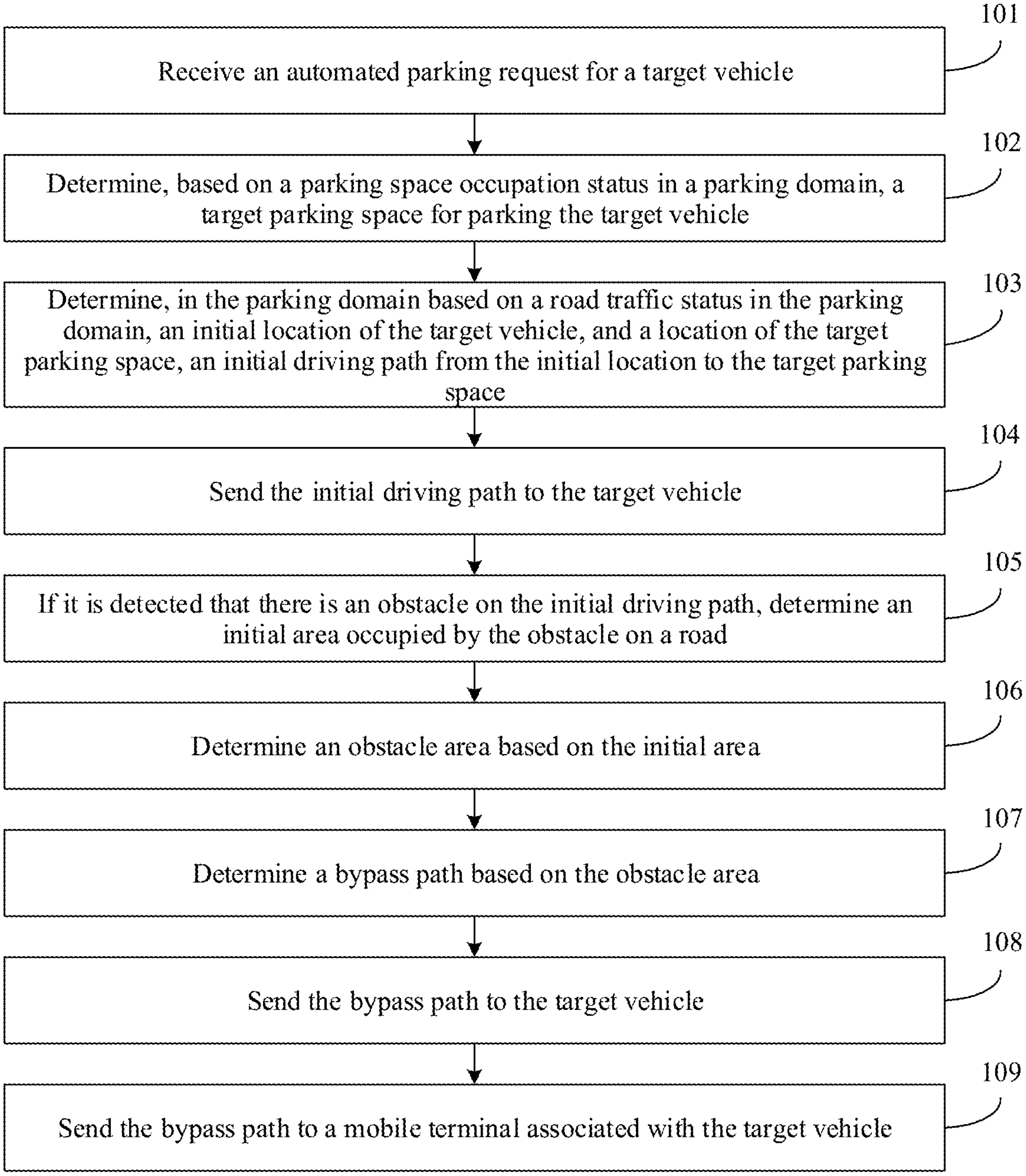
FIG. 10 is a flowchart of an automated parking method according to an embodiment of this application.

FIG. 10 is a flowchart of an automated parking method according to an embodiment of this application. The method may be applied to a parking domain, and may be applied to the automated parking apparatus provided in the foregoing embodiment. Refer to FIG. 10. The method includes the following operations.

Operation 101: Receive an automated parking request for a target vehicle.

When driving to an entrance of the parking domain, the target vehicle may send the automated parking request to an automated parking apparatus (for example, a lot server). For example, a parking control may be displayed on a human machine interface (human machine interface, HMI) in the target vehicle. After detecting a tap operation performed on the parking control, the target vehicle may send the automated parking request to the automated parking apparatus. Alternatively, the target vehicle may be associated with a mobile terminal. The mobile terminal may send the automated parking request to the automated parking apparatus when the target vehicle drives to the entrance of the parking domain.

In this embodiment of this application, the automated parking request may carry at least an identifier (for example, a license plate number) of the target vehicle, and may further carry information like an initial location of the target vehicle and a parking requirement of the target vehicle. The initial location of the target vehicle may be obtained by the target vehicle based on a locating apparatus of the target vehicle. The parking requirement may be a requirement for a location of a target parking space. For example, the parking requirement may include one or more of the following requirements: being close to the initial location of the target vehicle, being close to an elevator, being close to an exit, requiring charging, requiring car washing, and the like. Alternatively, the parking requirement may include an identifier of a parking space. In other words, the target vehicle may directly specify one or more parking spaces as the target parking space.

Operation 102: Determine, based on a parking space occupation status in the parking domain, the target parking space for parking the target vehicle.

After receiving the automated parking request for the target vehicle, the automated parking apparatus may determine, based on the parking space occupation status in the parking domain, the target parking space for parking the target vehicle. Compared with that in a blind parking space finding solution, the automated parking apparatus in this embodiment of this application can determine the target parking space in advance. Therefore, parking efficiency can be effectively improved.

It may be understood that if the automated parking request includes the parking requirement, the automated parking apparatus may determine, from idle parking spaces in the parking domain, the target parking space that meets the parking requirement. For example, it is assumed that the parking requirement is being close to an elevator. In this case, the automated parking apparatus may determine an idle parking space closest to the elevator as the target parking space. Alternatively, it is assumed that the parking requirement includes an identifier of a parking space. In this case, the automated parking apparatus may directly determine, as the target parking space, the parking space indicated by the identifier.

If the automated parking request does not carry the parking requirement, the automated parking apparatus may allocate the target parking space to the target vehicle according to a preset parking space allocation rule. The parking space allocation rule may include: allocating an idle parking space closest to the vehicle, or allocating an idle parking space closest to an exit.

In some embodiments, at least one visual sensor may be disposed above or on a side of each parking space in the parking domain. The automated parking apparatus may determine an occupation status of each parking space based on an image captured by the visual sensor. Certainly, the automated parking apparatus may alternatively determine a parking space occupation status based on data collected by a sensor (for example, a radar) of another type. This is not limited in this embodiment of this application.

Operation 103: Determine, in the parking domain based on a road traffic status in the parking domain, the initial location of the target vehicle, and a location of the target parking space, an initial driving path from the initial location to the target parking space.

In this embodiment of this application, after determining the target parking space, the automated parking apparatus may plan, for the target vehicle based on a road topology of the parking domain, the road traffic status in the parking domain, the initial location of the target vehicle, and the location of the target parking space, an initial driving path from the initial location to the target parking space.

The road traffic status may be determined by the automated parking apparatus based on data collected by a plurality of sensors in the parking domain, and the road traffic status may indicate whether each road in the parking domain is congested, whether there is an obstacle, and the like. The initial location of the target vehicle may be carried in the automated parking request, or may be determined by the automated parking apparatus based on the data collected by the sensors.

It may be understood that the automated parking apparatus may determine the initial driving path in the road topology of the parking domain based on a preconfigured path planning algorithm. If the automated parking apparatus calculates that there are a plurality of passable paths from the initial location to the target parking space, a path with a shortest length in the plurality of passable paths may be used as the initial driving path.

It may be further understood that the automated parking apparatus may identify and store a map of the parking domain based on the data collected by the plurality of sensors in the parking domain. Alternatively, the automated parking apparatus may prestore a map of the parking domain. The map may include at least the road topology of the parking domain, and may further include distribution locations of parking spaces in the parking domain, and locations of entrances and exits in the parking domain. In some embodiments, the map of the parking domain stored in the automated parking apparatus may be a high-definition map, and locating precision of the high-definition map may be at a centimeter level.

For example, as shown in FIG. 4, it is assumed that the initial location of the target vehicle 04 is at the entrance of the parking domain, and the target parking space determined by the automated parking apparatus is a parking space P0. In this case, the initial driving path planned by the automated parking apparatus 01 based on the road traffic status in the parking domain may be S1. It can be learned from FIG. 4 that there is no other vehicle or pedestrian on road segments included in the initial driving path S1.

Operation 104: Send the initial driving path to the target vehicle.

After determining the initial driving path, the automated parking apparatus may deliver the initial driving path to the target vehicle. The initial driving path indicates the target vehicle to drive from the initial location to the target parking space. As described above, the target vehicle may be a vehicle having at least a semi-automated driving function. Therefore, after receiving the initial driving path, the target vehicle may automatically drive to the target parking space based on the initial driving path, to implement automated parking.

Figure 11:
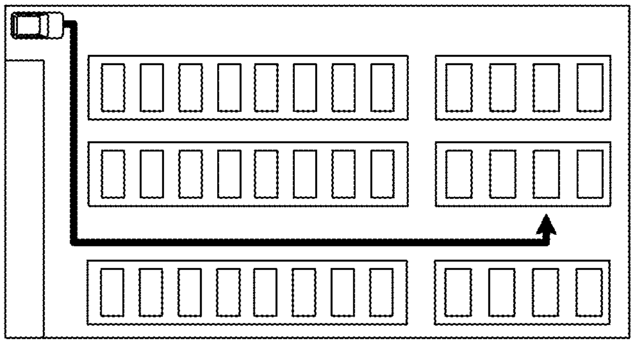
FIG. 11 is a schematic diagram of an HMI interface of a target vehicle according to an embodiment of this application.

FIG. 11 is a schematic diagram of an HMI interface of a target vehicle according to an embodiment of this application. As shown in FIG. 11, after receiving an initial driving path, the target vehicle may further display the initial driving path on the HMI of the target vehicle.

In a scenario in which the automated parking apparatus is a management cloud platform or a lot server, the automated parking apparatus may directly send the initial driving path to the target vehicle, or may send the initial driving path to a mobile terminal associated with the target vehicle, and then the mobile terminal sends the initial driving path to the target vehicle.

Figure 12:
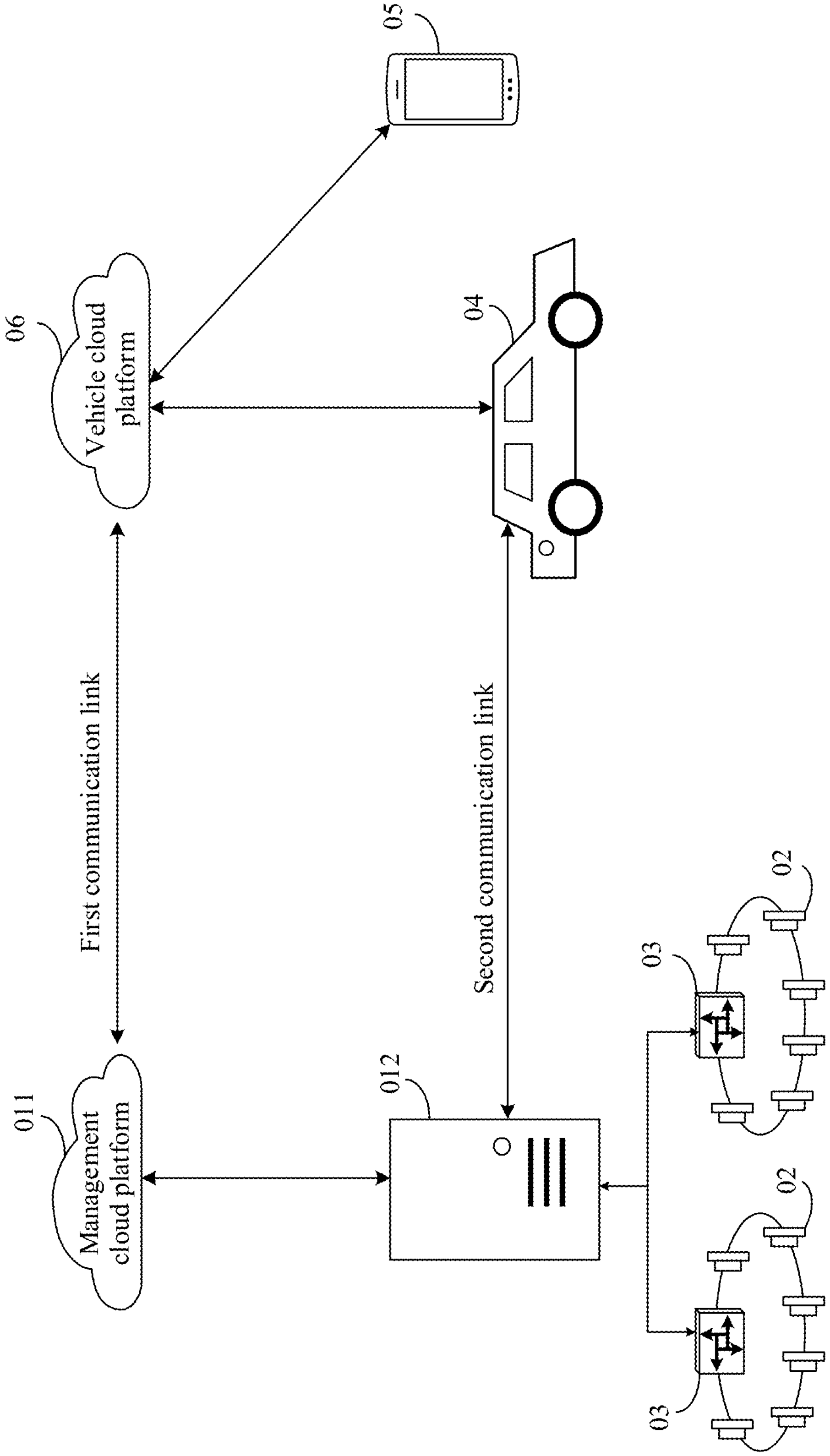
FIG. 12 is a schematic diagram of a structure of yet another automated parking system according to an embodiment of this application.

In a scenario, the automated parking apparatus 01 includes the management cloud platform 011 and the lot server 012. Refer to FIG. 3 and FIG. 12. The management cloud platform 011 may first send the initial driving path to the target vehicle 04 through a first communication link between the management cloud platform 011 and the target vehicle 04. If the management cloud platform detects that the first communication link is faulty, the management cloud platform 011 may send the initial driving path to the lot server 012. Then, the lot server 012 sends the initial driving path to the target vehicle 04 through a second communication link between the lot server 012 and the target vehicle 04. In other words, the second communication link may be used as a standby link of the first communication link, and the initial driving path is transmitted through the second communication link when the first communication link is faulty. In this way, reliable delivery of the initial driving path may be ensured.

It may be understood that, after receiving the initial driving path sent by the management cloud platform 011, the target vehicle 04 or the mobile terminal 05 may feed back a response message to the management cloud platform 011. Therefore, if the management cloud platform 011 does not receive the response message within target duration after sending the initial driving path through the first communication link, the management cloud platform 011 may determine that the first communication link is faulty.

In some embodiments, as shown in FIG. 12, the automated parking system may further include a vehicle cloud platform 06. The management cloud platform 011 may send the initial driving path to the vehicle cloud platform 06, and then the vehicle cloud platform 06 forwards the initial driving path to the target vehicle 04 or the mobile terminal 05. In other words, the first communication link may include: a link between the management cloud platform 011 and the vehicle cloud platform 06, and a link between the vehicle cloud platform 06 and the target vehicle 04. The vehicle cloud platform 06 may be a telematics service provider (telematics service provider, TPS) platform of an automobile enterprise.

It may be further understood that, in this embodiment of this application, a communication link between a cloud platform (including the management cloud platform 011 and the vehicle cloud platform 06) and the target vehicle 04 or the mobile terminal 05 may be a mobile communication link. For example, the communication link may be a 5th generation mobile communication technology (5th generation (5G) mobile networks) communication link. A communication link between the lot server 012 and the target vehicle 04 or the mobile terminal 05 may be a mobile communication link, or may be a link established based on a road side unit (RSU) or a cellular-vehicle to everything (C-V2X).

Operation 105: If it is detected that there is an obstacle on the initial driving path, determine an initial area occupied by the obstacle on the road.

In this embodiment of this application, after delivering the initial driving path, the automated parking apparatus may further continuously monitor a location of the target vehicle and a traffic status of the initial driving path. If the automated parking apparatus detects that there is an obstacle (for example, another vehicle or a pedestrian) on a road segment that is of the initial driving path and across which the target vehicle has not driven, the automated parking apparatus may first determine an initial area occupied by the obstacle on the road, to plan a bypass path for the target vehicle.

In some embodiments, for a scenario in which the plurality of sensors in the parking domain include visual sensors, as described above, the visual sensors may be arranged at intervals, and two adjacent visual sensors may be disposed opposite to each other. Therefore, the automated parking apparatus may detect a same target (the target vehicle or the obstacle) on the road by using data collected by the two adjacent visual sensors.

Figure 13:
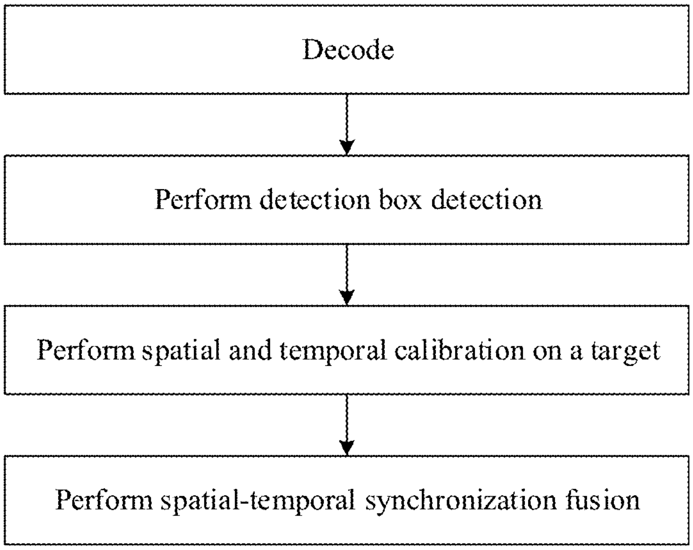
FIG. 13 is a schematic diagram of a target detection process according to an embodiment of this application.

Refer to FIG. 13. A process in which the automated parking apparatus detects a target may include the following. First, the automated parking apparatus decodes a video captured by a visual sensor, to obtain each frame of image in the video. Then, the automated parking apparatus may detect a target in each frame of image by using an object detection algorithm (which may also be referred to as a target detection algorithm), to obtain a detection box including the target. In addition, the automated parking apparatus calculates world coordinates corresponding to pixel coordinates of an edge corner point (for example, a vertex of the detection box) of the detection box. The target may include the target vehicle, and may further include the obstacle, a road surface sign line, and the like. Then, the automated parking apparatus may perform spatial and temporal calibration on the target based on a timestamp of each frame of image and pixel coordinates of the detection box that includes the target and that is in each frame of image, to track the target. Finally, the automated parking apparatus may fuse spatial-temporal data of the target based on a spatial-temporal fusion algorithm, to implement spatial-temporal synchronization.

It may be understood that in this embodiment of this application, the automated parking apparatus may track both the target vehicle and the obstacle, or may track only the target vehicle and does not need to track the obstacle.

It may be further understood that, because the image captured by the visual sensor is usually distorted to a specific extent, after obtaining the image captured by the visual sensor, the automated parking apparatus may further first correct the image, and then perform the foregoing feature extraction operation.

For a scenario in which the sensors disposed in the parking domain include a plurality of visual sensors, the automated parking apparatus may determine, based on an image that includes the obstacle and that is captured by at least one visual sensor, the initial area occupied by the obstacle on the road.

In some embodiments, an object detection algorithm is deployed in the automated parking apparatus. For example, the object detection algorithm may be a you only look once (you only look once, YOLO) algorithm. After obtaining the image captured by the visual sensor, the automated parking apparatus may identify the obstacle in the image by using the object detection algorithm, and may determine, based on pixel coordinates of the obstacle in the image and a conversion relationship between a pixel coordinate system and a world coordinate system, the initial area occupied by the obstacle on the road. The initial area may be represented by using world coordinates in the world coordinate system.

For example, the automated parking apparatus may determine, based on the object detection algorithm, a detection box (for example, a rectangular detection box) that includes the obstacle and that is in the image captured by the visual sensor. Then, pixel coordinates of vertices of the detection box may be converted into world coordinates in the world coordinate system, to obtain world coordinates of vertices of the initial area.

It may be understood that, when planning the bypass path, the automated parking apparatus only needs to consider a size of an area occupied by the obstacle on the road, and does not need to consider a height of the obstacle. Therefore, the world coordinates used to represent the initial area may include only Xw-axis coordinates and Yw-axis coordinates, and do not need to include Zw-axis coordinates. A plane defined by the Xw-axis and the Yw-axis may be parallel to the ground of the parking domain.

Figure 14:
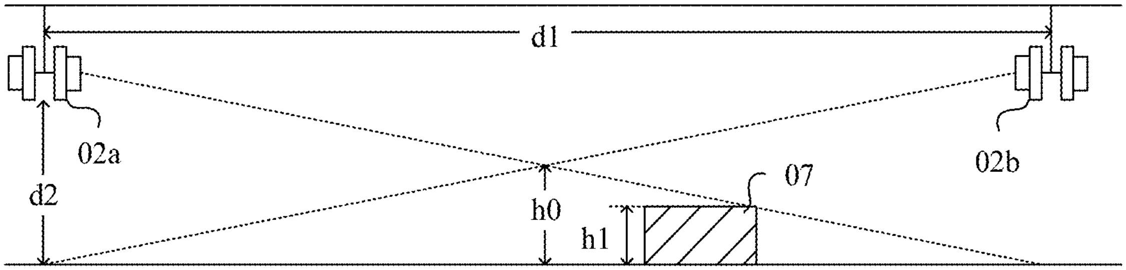
FIG. 14 is a schematic diagram of a field of view range of a visual sensor according to an embodiment of this application.

FIG. 14 is a schematic diagram of a field of view range of a visual sensor according to an embodiment of this application. Refer to FIG. 14. It can be learned that there is an overlapping area between field of view ranges of the two adjacent visual sensors 02*a* and 02*b*. It is assumed that, to ensure detection reliability, a radius of an effective field of view range of each visual sensor is equal to the spacing d1 between two adjacent visual sensors. In this case, it may be determined that a height h0 of the overlapping area meets h0/d2=½, that is, the height h0=d2/2. For example, it is assumed that d2=2.5 m. In this case, it may be determined that the height h0 of the overlapping area is 1.25 m.

Refer to FIG. 14. It may be understood that, if a height h1 of an obstacle 07 is less than h0, when the obstacle 07 is located at any location between the two adjacent visual sensors 02*a* and 02*b*, regardless of a posture of the obstacle 07, at least one visual sensor can detect a complete boundary of the obstacle. For example, it is assumed that actual field of view ranges of both the visual sensors 02*a* and 02*b* are far greater than the spacing d2, and the height h1 of the obstacle 07 is less than h0. In this case, when the obstacle 07 is located at any location between the two adjacent visual sensors 02*a* and 02*b*, both the visual sensors 02*a* and 02*b* can detect the complete boundary of the obstacle 07.

Figure 15:
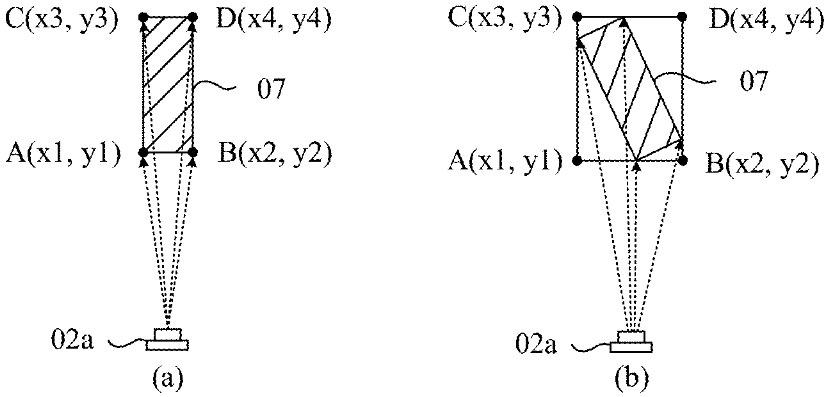
FIG. 15 is a top view of an obstacle according to an embodiment of this application.

FIG. 15 is a top view of an obstacle according to an embodiment of this application. Refer to (a) and (b) in FIG. 15. It can be learned that in a scenario in which the height h1 of the obstacle 07 is less than h0, the automated parking apparatus may determine, based on an image that includes the obstacle 07 and that is captured by the visual sensor 02*a* or 02*b* (the visual sensor 02*a* is used as an example in FIG. 15), an initial area occupied by the obstacle 07. As shown in FIG. 15, the initial area may be a rectangular area, and the automated parking apparatus may determine world coordinates of four vertices (namely, a vertex A to a vertex D) of the rectangular area. It can be further learned by comparing (a) and (b) in FIG. 15 that, regardless of a posture of the obstacle 07, the initial areas determined by the automated parking apparatus may all be rectangular areas. In addition, one edge of the rectangular area may be parallel to the Xw-axis, and the other edge may be parallel to the Yw-axis.

In this embodiment of this application, the Xw-axis that is set when the automated parking apparatus performs image calibration on each visual sensor may be parallel to a width direction of the road on which the visual sensor is deployed, and the Yw-axis may be parallel to an extension direction of the road on which the visual sensor is deployed, namely, a length direction of the road. Correspondingly, an absolute value of a difference between Xw coordinates of a vertex A and a vertex B (or a vertex C and a vertex D) in FIG. 5 is a largest width of the obstacle 07, and an absolute value of a difference between Yw coordinates of the vertex A and the vertex C (or the vertex B and the vertex D) is a largest length of the obstacle 07.

Figure 16:
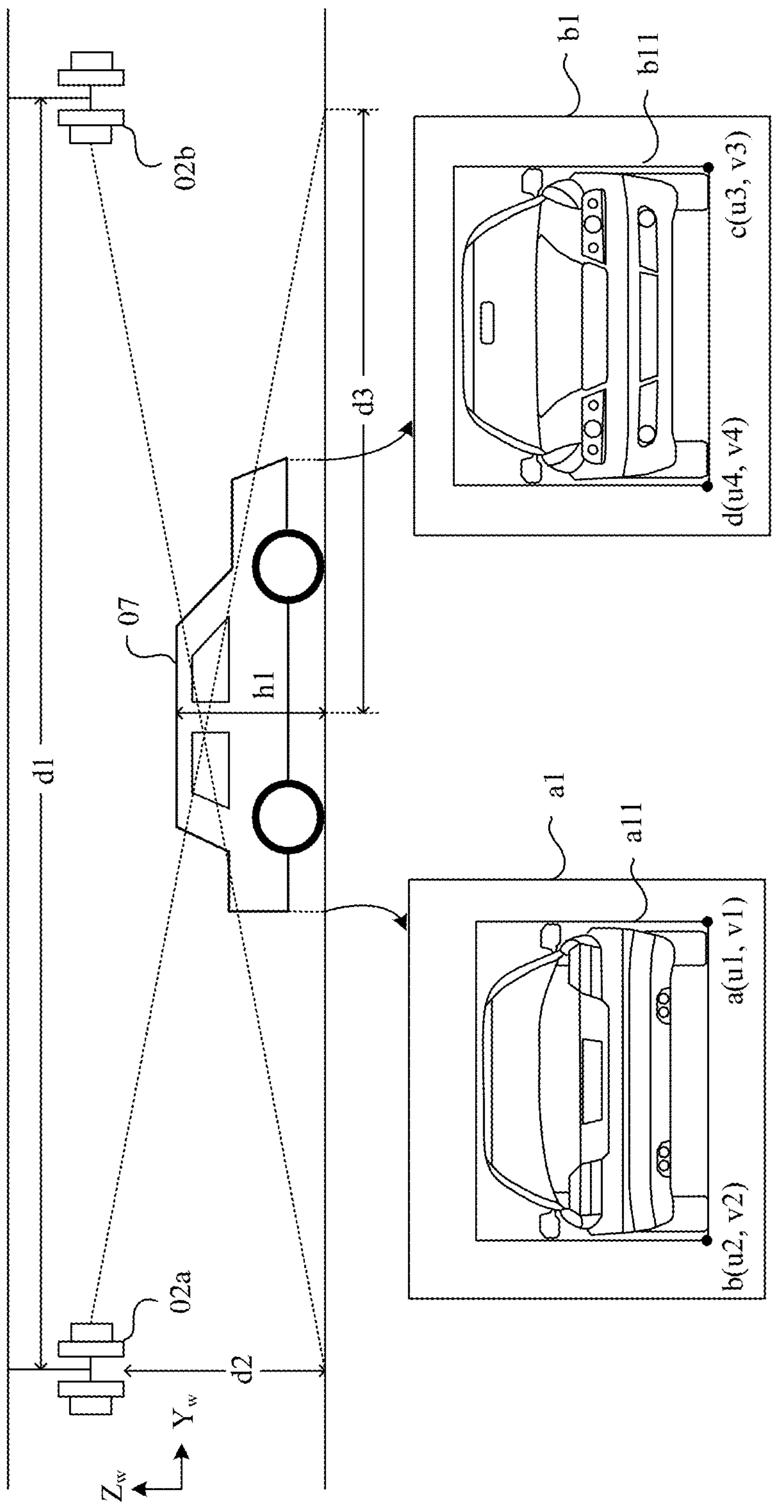
FIG. 16 is a partial side view of a parking domain according to an embodiment of this application.
Figure 17:
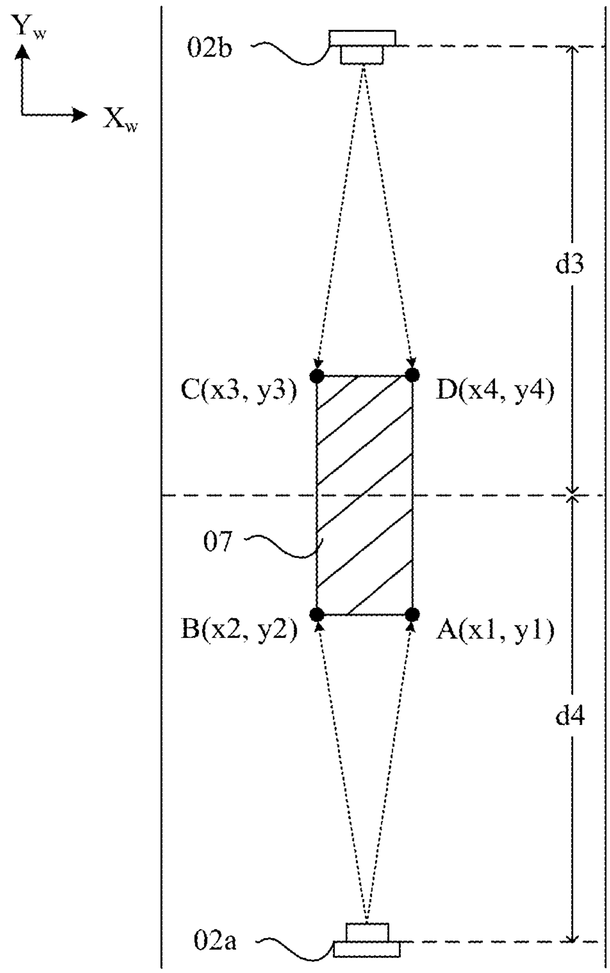
FIG. 17 is a top view of a scenario shown in FIG. 16.

Refer to FIG. 16. If the height h1 of the obstacle 07 is greater than h0, when h1/d3>d2/d1 the obstacle 07 blocks a field of view of the visual sensor 02*a*. Consequently, the visual sensor 02*a* cannot detect the complete boundary of the obstacle 07. FIG. 17 is a top view of a scenario shown in FIG. 16. Refer to FIG. 16 and FIG. 17. It can be learned that d3 refers to a distance between a center of the obstacle 07 and the visual sensor 02*b*, or may refer to a distance between a center of the obstacle 07 and a boundary of an effective field of view range of the visual sensor 02*a*. Similarly, it can be learned that, when h1/d4>d2/d1, the obstacle 07 blocks a field of view of the visual sensor 02*b*, where d4 refers to a distance between the center of the obstacle 07 and the visual sensor 02*a*, or may refer to a distance between the center of the obstacle 07 and a boundary of an effective field of view range of the visual sensor 02*b*, that is, d4=d1−d3.

It is assumed that d1=20 m, d2=2.5 m, and the height h1 of the obstacle 07 meets h1=1.5 m. In this case, it may be obtained through calculation that when d3<12 m, the obstacle 07 blocks the field of view of the visual sensor 02*a*, and when d4<12 m, the obstacle 07 blocks the field of view of the visual sensor 02*b*. Because d3+d4=20, it can be deduced that when 8 m<d3<12 m, the obstacle 07 blocks both the field of view of the visual sensor 02*a* and the field of view of the visual sensor 02*b*. In this case, the images captured by the two visual sensors 02*a* and 02*b* are needed to jointly determine the initial area occupied by the obstacle 07 on the road, to ensure reliability of the determined initial area, and further ensure reliability of a planned bypass path.

For example, as shown in FIG. 16, if the obstacle 07 is a vehicle, because a height of a vehicle is usually 1.4 m to 1.6 m, when the vehicle is located between the visual sensors 02*a* and 02*b*, and a distance between the vehicle and the visual sensor 02*b* is greater than 8 m and less than 12 m, the visual sensor 02*a* can detect only a boundary of the rear of the vehicle, but cannot detect a boundary of the front of the vehicle; and the visual sensor 02*b* can detect only the boundary of the front of the vehicle, but cannot detect the boundary of the rear of the vehicle. Therefore, the images captured by the two visual sensors 02*a* and 02*b* are needed to jointly determine the initial area occupied by the vehicle on the road.

Figure 18:
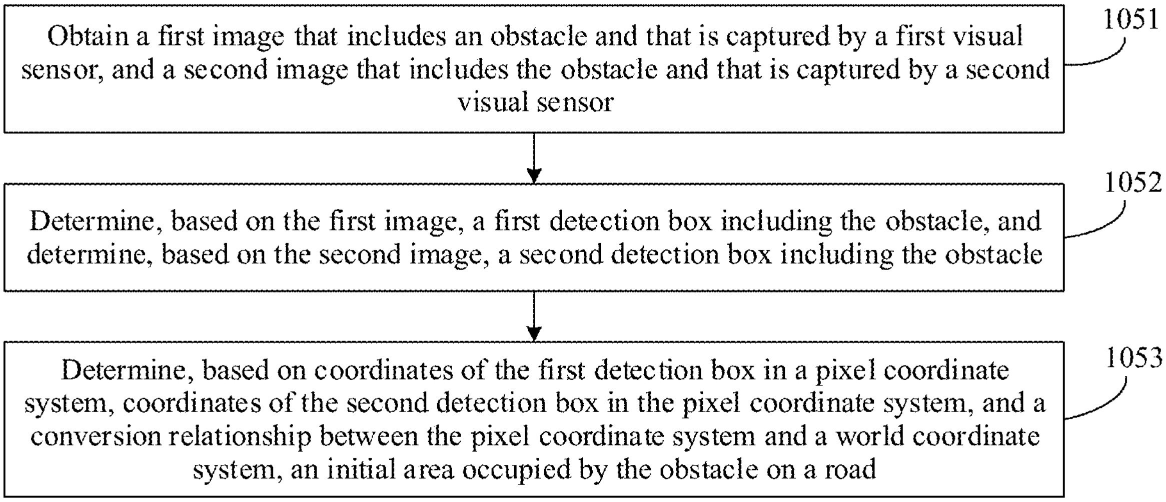
FIG. 18 is a flowchart of a method for determining an initial area occupied by an obstacle on a road according to an embodiment of this application.

FIG. 18 is a flowchart of a method for determining an initial area occupied by an obstacle on a road according to an embodiment of this application. Refer to FIG. 18. The method may include the following operations.

Operation 1051: Obtain a first image that includes the obstacle and that is captured by a first visual sensor, and a second image that includes the obstacle and that is captured by a second visual sensor.

The first visual sensor and the second visual sensor may be arranged in an extension direction of the road, and are separately located on two sides of the obstacle, that is, the obstacle is located between the two visual sensors. For example, refer to FIG. 16. For the obstacle 07, the automated parking apparatus may obtain a first image a1 that includes the obstacle 07 and that is captured by the visual sensor 02*a*, and may obtain a second image b1 that includes the obstacle 07 and that is captured by the visual sensor 02*b*.

Operation 1052: Determine, based on the first image, a first detection box including the obstacle, and determine, based on the second image, a second detection box including the obstacle.

In this embodiment of this application, an object detection algorithm is preconfigured in the automated parking apparatus. The automated parking apparatus may separately process the first image and the second image by using the object detection algorithm, to determine, in the first image, the first detection box including the obstacle, and determine, in the second image, the second detection box including the obstacle.

For example, refer to FIG. 16. The automated parking apparatus may determine, in the first image a1, a first detection box all including the obstacle 07, and may determine, in the second image b1, a second detection box b11 including the obstacle 07.

In some embodiments, as shown in FIG. 16, both the first detection box all and the second detection box b11 may be rectangular detection boxes. Certainly, the two detection boxes may alternatively be in another shape. For example, the two detection boxes may be a circle or a polygon other than a rectangle.

Operation 1053: Determine, based on coordinates of the first detection box in a pixel coordinate system, coordinates of the second detection box in the pixel coordinate system, and a conversion relationship between the pixel coordinate system and a world coordinate system, the initial area occupied by the obstacle on the road.

The automated parking apparatus prestores the conversion relationship between the pixel coordinate system and the world coordinate system, for example, the conversion relationship shown in Formula (4). The automated parking apparatus may first separately determine coordinates of the first detection box and the second detection box in the pixel coordinate system. For example, the automated parking apparatus may determine pixel coordinates that are of vertices of each detection box and that are in the pixel coordinate system. Then, the pixel coordinates of the detection box may be converted into world coordinates in the world coordinate system based on the prestored conversion relationship, to obtain the initial area occupied by the obstacle on the road.

Figure 19:
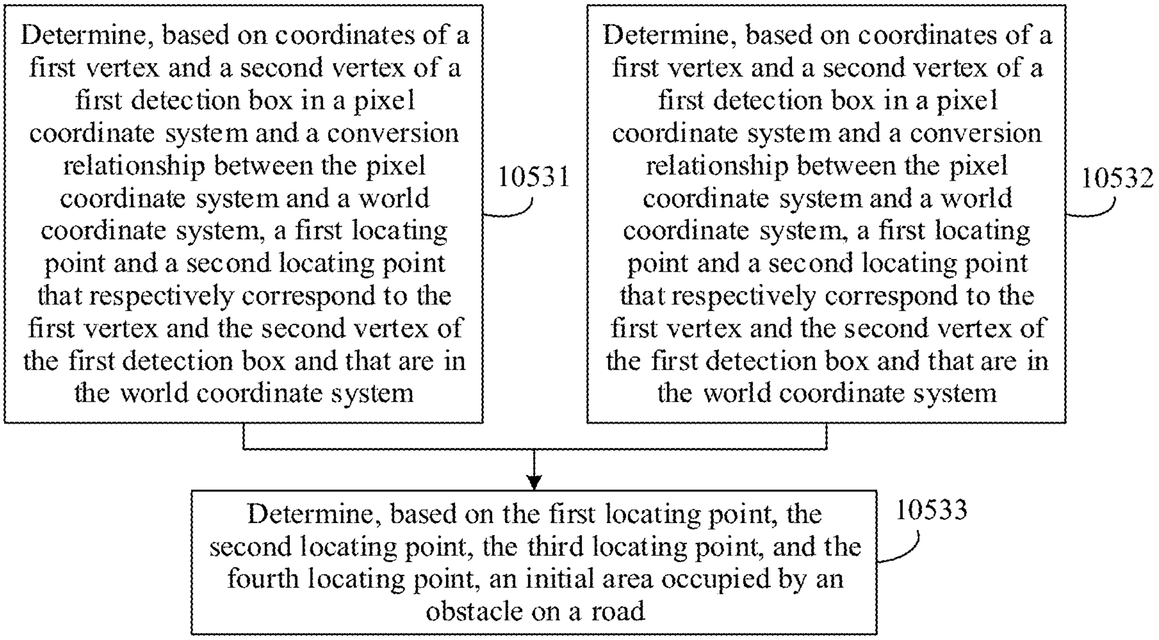
FIG. 19 is a flowchart of a method for determining an initial area based on pixel coordinates of a detection box according to an embodiment of this application.

The following describes an embodiment of a process of operation 1053 by using an example in which both the first detection box and the second detection box are rectangular detection boxes. Refer to FIG. 19. Operation 1053 may include the following operations.

Operation 10531: Determine, based on coordinates of a first vertex and a second vertex of the first detection box in the pixel coordinate system and the conversion relationship between the pixel coordinate system and the world coordinate system, a first locating point and a second locating point that respectively correspond to the first vertex and the second vertex of the first detection box and that are in the world coordinate system.

The first vertex and the second vertex of the first detection box are two vertices that are in four vertices of the first detection box and that are close to the road. It may be understood that, because a disposition location of each visual sensor in the parking domain is fixed, and the automated parking apparatus can pre-calibrate an image captured by each visual sensor, the automated parking apparatus may determine an area in which the road is located in the image captured by the visual sensor. Further, after determining the first detection box including the obstacle, the automated parking apparatus may determine the first vertex and the second vertex that are of the four vertices of the first detection box and that are close to the road. Then, the automated parking apparatus may determine world coordinates of the first locating point that corresponds to the first vertex of the first detection box and that is in the world coordinate system and world coordinates of the second locating point that corresponds to the second vertex of the first detection box and that is in the world coordinate system.

For example, refer to FIG. 8 and FIG. 16. It is assumed that in the image captured by the visual sensor, the origin o of the pixel coordinate system is an upper-left vertex of the image, the u-axis of the pixel coordinate system is parallel to a pixel row direction of the image, and the v-axis is parallel to a pixel column direction. If the automated parking apparatus pre-calibrates the image captured by the first visual sensor 02*a*, and determines that the road is located in a lower half part of the image, in a process of determining the initial area occupied by the obstacle, after determining the first detection box all in the first image a1 captured by the first visual sensor 02*a*, the automated parking apparatus may determine, as the first vertex and the second vertex that are close to the road, two vertices a (u1, v1) and b (u2, v2) that are of the four vertices of the first detection box all and whose v-axis coordinates are larger.

With reference to FIG. 16 and FIG. 17, the automated parking apparatus may determine, based on the conversion relationship shown in Formula (4), world coordinates (x1, y1) of the first locating point A that corresponds to the first vertex a (u1, v1) and that is in the world coordinate system, and world coordinates (x2, y2) of the second locating point B that corresponds to the second vertex b (u2, v2) and that is in the world coordinate system.

Operation 10532: Determine, based on coordinates of a first vertex and a second vertex of the second detection box in the pixel coordinate system and the conversion relationship between the pixel coordinate system and the world coordinate system, a third locating point and a fourth locating point that respectively correspond to the first vertex and the second vertex of the second detection box and that are in the world coordinate system.

The first vertex and the second vertex of the second detection box are two vertices that are in four vertices of the second detection box and that are close to the road. In addition, the third locating point in the world coordinate system corresponds to the first vertex of the second detection box, and the fourth locating point in the world coordinate system corresponds to the second vertex of the second detection box. For a process in which the automated parking apparatus determines the third locating point and the fourth locating point, refer to operation 10531. Details are not described herein again.

For example, refer to FIG. 16. After determining the second detection box b11 in the second image b1 captured by the second visual sensor 02*b*, the automated parking apparatus may determine, as the first vertex and the second vertex that are close to the road, two vertices c (u3, v3) and d (u4, v4) that are in four vertices of the second detection box b11 and whose v-axis coordinates are larger.

With reference to FIG. 16 and FIG. 17, the automated parking apparatus may determine, based on the conversion relationship shown in Formula (4), world coordinates (x3, y3) of the third locating point C that corresponds to the first vertex c (u3, v3) of the second detection box b11 and that is in the world coordinate system, and world coordinates (x4, y4) of the fourth locating point D that corresponds to the second vertex d (u4, v4) of the second detection box b11 and that is in the world coordinate system.

Operation 10533: Determine, based on the first locating point, the second locating point, the third locating point, and the fourth locating point, the initial area occupied by the obstacle on the road.

After determining the first locating point to the fourth locating point, the automated parking apparatus may determine, based on the four locating points, the initial area occupied by the obstacle on the road. For example, the automated parking apparatus may determine, as the initial area, a quadrilateral area in which the four locating points are used as vertices. Alternatively, the automated parking apparatus may first determine a quadrilateral that uses the four locating points as vertices, and then determine, as the initial area, an area occupied by a smallest circumscribed rectangle or a smallest circumscribed circle of the quadrilateral.

In an embodiment, if a distance between the first locating point A and the fourth locating point D is greater than a fourth distance threshold, and a distance between the second locating point B and the third locating point C is greater than the fourth distance threshold, the automated parking apparatus may determine that the first visual sensor 02*a* and the second visual sensor 02*b* respectively detect different vertices of the area occupied by the obstacle. Correspondingly, the automated parking apparatus may determine, as the initial area, a rectangular area enclosed by sequentially connecting the first locating point A, the second locating point B, the third locating point C, and the fourth locating point D.

For example, refer to FIG. 16 and FIG. 17. It is assumed that the obstacle 07 is a vehicle, the first visual sensor 02*a* is located at a rear end of the vehicle 07, and the second visual sensor 02*b* is located at a front end of the vehicle. In this case, the first locating point A and the second locating point B that are determined by the automated parking apparatus based on the first image a1 captured by the first visual sensor 02*a* are two endpoints at the rear of the vehicle, and the third locating point C and the fourth locating point D that are determined by the automated parking apparatus based on the second image b1 captured by the second visual sensor 02*b* are two endpoints at the front of the vehicle.

In some embodiments, as shown in FIG. 17, the automated parking apparatus may determine an absolute value (namely, |x2−x1|) of a difference between Xw-axis coordinates of the first locating point A and the second locating point B as a first width of the obstacle 07, and may determine an absolute value (namely, |x4−x3|) of a difference between Xw-axis coordinates of the third locating point C and the fourth locating point D as a second width of the obstacle 07. A larger value of the first width and the second width is a largest width of the obstacle 07.

Similarly, the automated parking apparatus may further determine an absolute value (namely, |y4−y1|) of a difference between Yw-axis coordinates of the first locating point A and the fourth locating point D as a first length of the obstacle 07, and may determine an absolute value (namely, |y3−y2|) of a difference between Yw-axis coordinates of the second locating point B and the third locating point C as a second length of the obstacle 07. A larger value of the first length and the second length is a largest length of the obstacle 07. Refer to FIG. 17. It can be learned that both a width direction of the obstacle 07 and the width direction of the road are parallel to the Xw-axis, and both a length direction of the obstacle 07 and the length direction of the road are parallel to the Yw-axis.

It may be understood that, in this embodiment, the automated parking apparatus may further determine a posture of the obstacle 07 based on coordinates of each locating point. For example, refer to FIG. 7. If both an absolute value |x4−x1| of a difference between Xw-axis coordinates of the first locating point A and the fourth locating point D and an absolute value |x3−x2| of a difference between Xw-axis coordinates of the second locating point B and the third locating point C are less than a difference threshold (for example, 5 cm), the automated parking apparatus may determine that a length direction of the initial area is parallel to the extension direction of the road. For example, if the obstacle is a vehicle, the automated parking apparatus may determine that the vehicle is parallel to the road.

In another embodiment, if a distance between the first locating point A and the fourth locating point D is less than or equal to a fourth distance threshold, and a distance between the second locating point B and the third locating point C is less than or equal to the fourth distance threshold, the automated parking apparatus may determine that the two vertices detected by the first visual sensor 02*a* are the same as the two vertices detected by the second visual sensor 02*b*. The fourth distance threshold is a fixed value prestored in the automated parking apparatus, and may be, for example, 5 cm.

Figure 20:
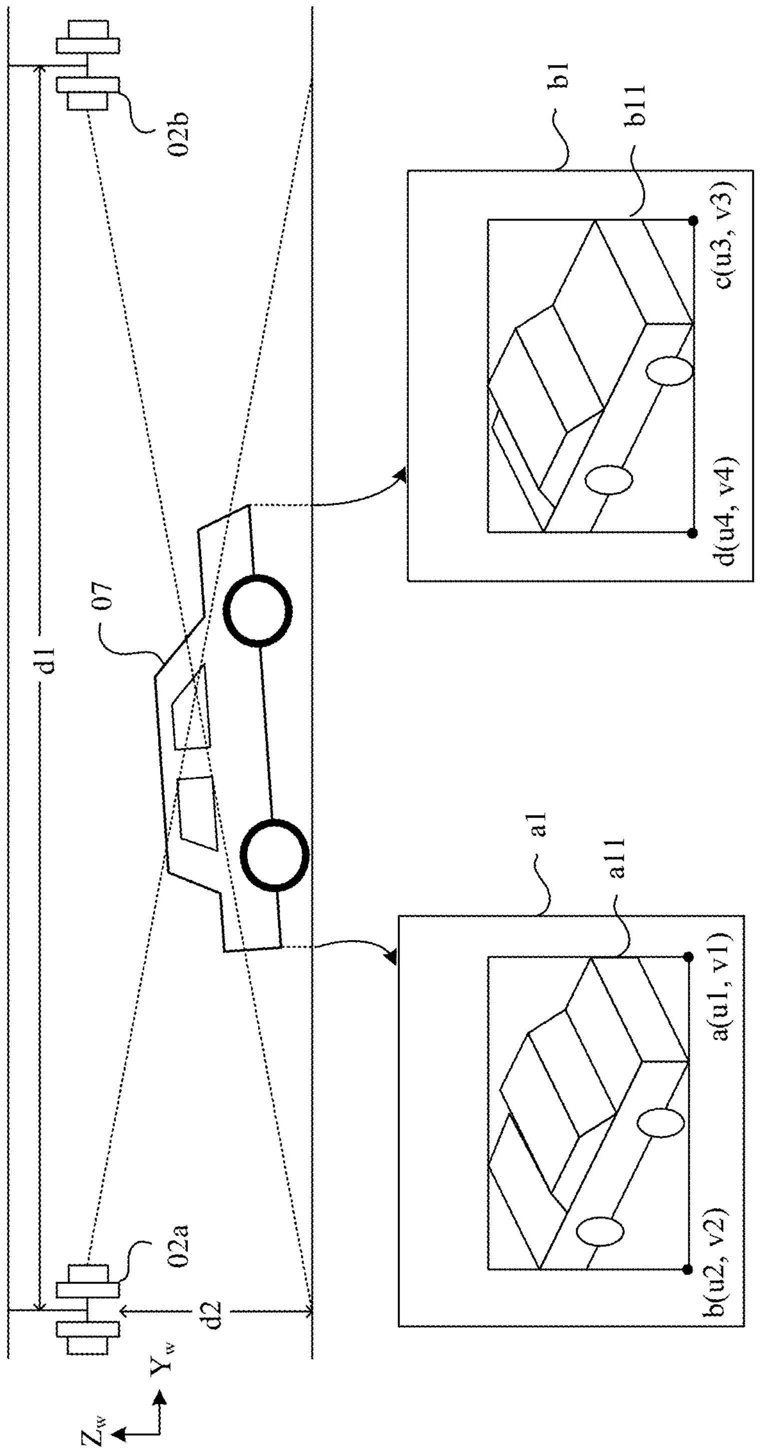
FIG. 20 is another partial side view of a parking domain according to an embodiment of this application.
Figure 21:
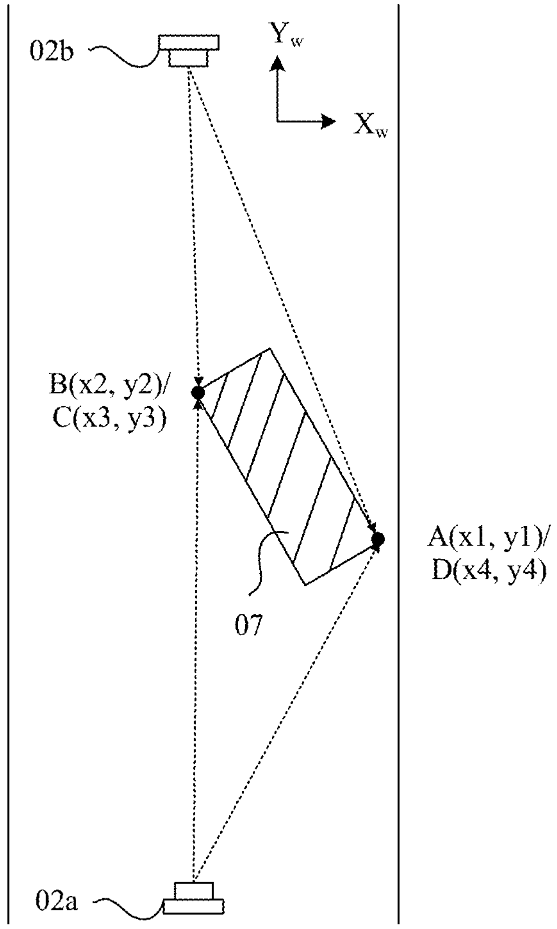
FIG. 21 is a top view of a scenario shown in FIG. 20.

For example, refer to FIG. 20 and FIG. 21. If the length direction of the obstacle 07 is not parallel to the length direction of the road, that is, the obstacle 07 is in an inclined shape, both the first locating point A and the second locating point B that are determined by the automated parking apparatus based on the first vertex a and the second vertex b of the first detection box a11 and the third locating point C and the fourth locating point D that are determined by the automated parking apparatus based on the first vertex c and the second vertex d of the second detection box b11 are two endpoints on a diagonal of the obstacle 07. Therefore, as shown in FIG. 21, the first locating point A coincides with the fourth locating point D, and the second locating point B coincides with the third locating point C.

Figure 22:
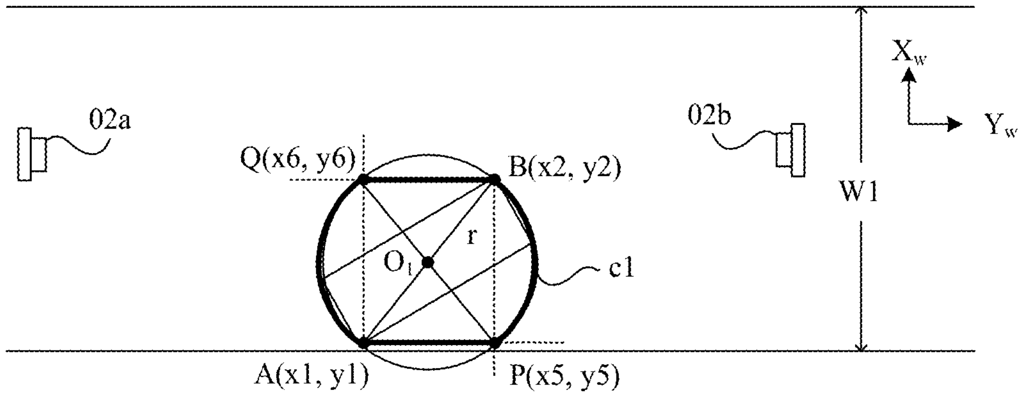
FIG. 22 is a schematic diagram of an initial area according to an embodiment of this application.

In this embodiment, the automated parking apparatus may determine a fifth locating point P and a sixth locating point Q based on the first locating point A and the second locating point B (or the third locating point C and the fourth locating point D), and determine, as the initial area occupied by the obstacle, an area c1 enclosed by sequentially connecting the first locating point A, the fifth locating point P, the second locating point B, and the sixth locating point Q. As shown in FIG. 22, a first coordinate x5 of the fifth locating point P is equal to a first coordinate x1 of the first locating point A, and a second coordinate y5 of the fifth locating point P is equal to a second coordinate y2 of the second locating point B, that is, x5=x1, and y5=y2. A first coordinate x6 of the sixth locating point Q is equal to a first coordinate x2 of the second locating point B, and a second coordinate y6 of the sixth locating point Q is equal to a second coordinate y1 of the first locating point A, that is, x6=x2, and y6=y1.

A coordinate axis (namely, the Xw-axis) of the first coordinate of each locating point is parallel to the width direction of the road, and a coordinate axis (namely, the Yw-axis) of the second coordinate is perpendicular to the coordinate axis of the first coordinate and is parallel to the extension direction of the road. Correspondingly, as shown in FIG. 22, the fifth locating point P may be understood as follows: An extension line is made from the first locating point A towards a Yw-axis direction, an extension line is made from the second locating point B towards an Xw-axis direction, and an intersection point of the two extension lines is the fifth locating point P. The sixth locating point Q may be understood as follows: An extension line is made from the first locating point A towards the Xw-axis direction, an extension line is made from the second locating point B towards the Yw-axis direction, and an intersection point of the two extension lines is the sixth locating point Q.

Still refer to FIG. 22. In the initial area c1, both a connection line between the first locating point A and the fifth locating point P and a connection line between the second locating point B and the sixth locating point Q are straight lines, and both a connection line between the first locating point A and the sixth locating point Q and a connection line between the second locating point B and the fifth locating point P are arcs. A circle center $O_1$ of the arc is a center point of a rectangle that uses the first locating point A, the second locating point B, the fifth locating point P, and the sixth locating point Q as vertices. In other words, world coordinates of the circle center $O_1$ are $$\left(\frac{x_1+x_2}{2}, \frac{y_1+y_2}{2}\right),$$

and a radius r of the arc meets:

$$r=\sqrt{\left(\frac{x_2-x_1}{2}\right)^2+\left(\frac{y_2-y_1}{2}\right)^2}.$$

In this embodiment, the largest width of the obstacle 07 may be equal to the absolute value |x2−x1| of the difference between the Xw-axis coordinates (namely, the first coordinates) of the first locating point A and the second locating point B, and the largest length of the obstacle 07 may be equal to a diameter 2r of a circle in which the arc is located.

It can be learned with reference to FIG. 22 that two vertices of the initial region c1 that are farthest apart in the Yw-axis direction are respectively located on an arc AQ and an arc BP.

It may be understood that, in operation 105, if the automated parking apparatus determines that the height h1 of the obstacle meets h1≤h0, the automated parking apparatus may determine, based on an image that is captured by a visual sensor and that includes the obstacle, the initial area occupied by the obstacle. Alternatively, if the automated parking apparatus determines that the height h1 of the obstacle meets h1>h0, the automated parking apparatus may determine, based on images that are captured by two visual sensors and that include the obstacle, the initial area occupied by the obstacle. Alternatively, the automated parking apparatus may not need to determine the height of the obstacle. To be specific, for each obstacle, the automated parking apparatus may determine, based on images that are captured by two visual sensors and that include the obstacle, an initial area occupied by the obstacle.

It may be further understood that when determining the height of the obstacle, the automated parking apparatus may determine an object type of the obstacle based on the object detection algorithm, and then determine the height of the obstacle based on a prestored correspondence between an object type and a height. Alternatively, the automated parking apparatus may detect the height of the obstacle based on a sensor (for example, a laser sensor) disposed in the parking domain. Alternatively, if the obstacle is a vehicle, the automated parking apparatus may further determine the height of the vehicle based on vehicle information reported by the vehicle.

Operation 106: Determine an obstacle area based on the initial area.

Figure 23:
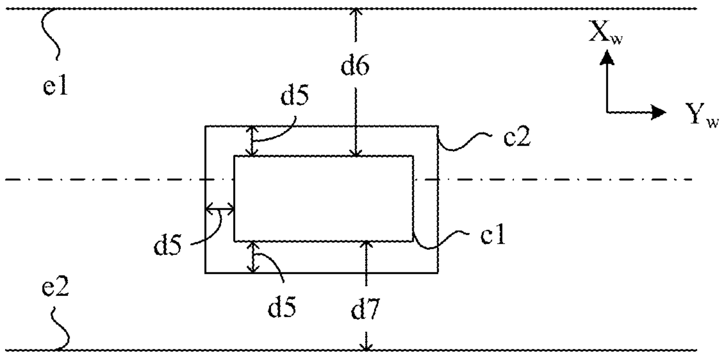
FIG. 23 is a schematic diagram of an obstacle area according to an embodiment of this application.

After determining the initial area occupied by the obstacle on the road, the automated parking apparatus may further determine the obstacle area based on the initial area, to plan a highly reliable bypass path based on the obstacle area. As shown in FIG. 23, the initial area c1 is located within the obstacle area c2, and a distance d5 between a target boundary of the obstacle area c2 and a target boundary of the initial area c1 is greater than or equal to a safe distance threshold d. In other words, the automated parking apparatus may extend the target boundary of the initial area c1, to obtain the obstacle area. The safe distance threshold d may refer to a minimum interval that needs to be maintained between the vehicle and the obstacle to ensure safe driving of the vehicle. For example, a range of the safe distance threshold d may be 0.5 m to 1 m.

It may be understood that a shape of the obstacle area c2 may be the same as a shape of the initial area c1. For example, if the target boundary of the initial area c1 includes an arc-shaped line segment, the target boundary of the obstacle area c2 also includes an arc-shaped line segment.

In a possible example, as shown in FIG. 23, the target boundary of the initial area c1 may be all boundaries of the initial area c1, and correspondingly, the target boundary of the obstacle area c2 is also all boundaries of the obstacle area c2. In FIG. 23, an example in which both the initial area c1 and the obstacle area c2 are rectangles is used. In this case, both the target boundary of the initial area c1 and the target boundary of the obstacle area c2 include four sides of the rectangles.

Figure 24:
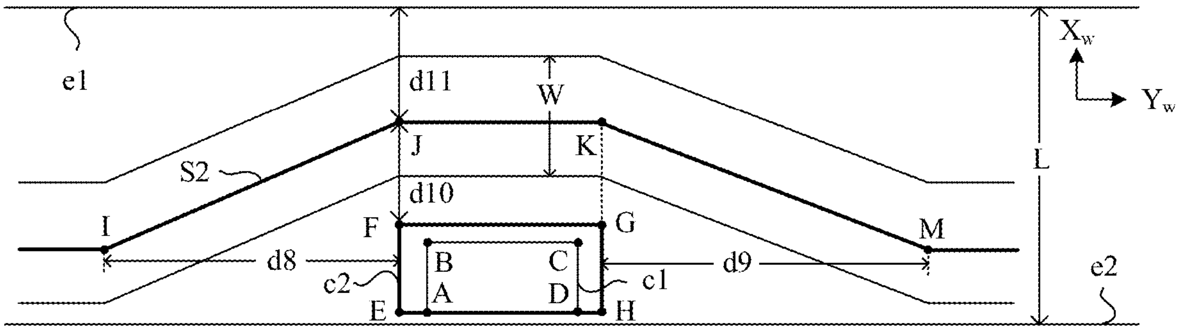
FIG. 24 is a schematic diagram of a bypass path according to an embodiment of this application.

In another possible example, because the automated parking apparatus may plan a bypass path only on one side of the obstacle, as shown in FIG. 24, the automated parking apparatus may alternatively extend only some boundaries of the initial area c1 to obtain the obstacle area. In other words, the target boundary of the initial area c1 may be some boundaries of the initial area c1, and the target boundary of the obstacle area c2 is also some boundaries of the obstacle area c2. In addition, some other boundaries of the obstacle area c2 may be collinear with some other boundaries of the initial area c1. In this example, the automated parking apparatus may plan the bypass path on a side that is of the target boundary of the obstacle area c2 and that is away from the target boundary of the initial area c1.

In some embodiments, refer to FIG. 23. The automated parking apparatus may further first separately determine a shortest distance d6 between the initial area c1 occupied by the obstacle and a first edge e1 of the road, and a shortest distance d7 between the initial area c1 and a second edge e2 of the road. Both the shortest distances d6 and d7 are distances parallel to the width direction (namely, the Xw-axis direction) of the road. If d6=d7, the automated parking apparatus may determine that the bypass path can be planned between the initial area c1 and any edge of the road. Correspondingly, the automated parking apparatus may extend a boundary that is of the initial area c1 and that is close to the any edge, to obtain the obstacle area c2.

If d6>d7, the automated parking apparatus may plan the bypass path between the initial area c1 and the first edge e1, that is, may plan the bypass path on a side having a larger distance between the initial area c1 and the road edge, to ensure that the target vehicle can reliably bypass the obstacle. For a scenario in which d6>d7, the automated parking apparatus may extend a boundary that is of the initial area c1 and that is close to the first edge e1, to obtain the obstacle area c2. In this scenario, a non-extended boundary (namely, a boundary collinear with the obstacle area c2) of the initial area c1 may be a boundary close to the second edge e2.

For example, refer to FIG. 24. It is assumed that both the initial area c1 and the obstacle area c2 are rectangles, and a shortest distance between the initial area c1 and the first edge e1 of the road is larger. In this case, the target boundary of the initial area c1 may include a first side AB, a second side BC, and a third side CD of the initial area c1. The target boundary of the obstacle area c2 may include a first side EF, a second side FG, and a third side GH of the obstacle area c2. In addition, a fourth side AD of the initial area c1 is collinear with a fourth side EH of the obstacle area. The first sides AB and EF, and the third sides CD and GH are all parallel to the width direction of the road, that is, parallel to the Xw-axis. The second sides BC and FG, and the fourth sides AD and EH are all parallel to the extension direction of the road, that is, parallel to the Yw-axis. In addition, compared with the fourth side AD of the initial area c1, the second side BC of the initial area c1 is closer to the first edge e1.

Operation 107: Determine the bypass path based on the obstacle area.

The automated parking apparatus may plan the bypass path on a side that is of the target boundary of the obstacle area and that is away from the target boundary of the initial area. The bypass path does not overlap the obstacle area. It may be understood that, for a scenario in which the shortest distance between the initial area c1 and the first edge e1 of the road is greater than the shortest distance between the initial area c1 and the second edge e2 of the road, as shown in FIG. 24, the bypass path S2 may be located between the target boundary of the obstacle area c2 and the first edge e1.

Refer to FIG. 24. When determining the bypass path, the automated parking apparatus may separately determine a start point I, an end point M, and at least one intermediate point of the bypass path S2 based on the obstacle area c2. For example, FIG. 24 shows two intermediate points J and K. It can be learned with reference to FIG. 24 and FIG. 25 that both the start point I and the end point M may be located on an initial driving path S1, and both a shortest distance d8 between the start point I and the obstacle area c2 and a shortest distance d9 between the end point M and the obstacle area c2 are greater than or equal to a first distance threshold. Each intermediate point is located outside the initial driving path S1, a shortest distance d10 between each intermediate point and the obstacle area c2 is greater than or equal to a second distance threshold, and a shortest distance d11 between each intermediate point and an edge (for example, the first edge c1) of the road on which the obstacle is located is greater than or equal to a third distance threshold.

The first distance threshold may be equal to a minimum turning radius of the target vehicle, and may be equal to, for example, 1.5 m or 2 m. Both the shortest distance d8 and the shortest distance d9 are enabled to be greater than the first distance threshold, so that it can be ensured that a sufficient safe distance is reserved for the target vehicle to turn. It should be understood that the shortest distances d8 and d9 may be equal or unequal. This is not limited in this embodiment of this application.

The second distance threshold may be greater than or equal to W/2, and the third distance threshold may be greater than or equal to (W/2+d). W is a width of the target vehicle, and d is a safe distance threshold. For example, W may be equal to 2 m, and d may be equal to 0.5 m. The shortest distance d10 is enabled to be greater than or equal to the second distance threshold, and the shortest distance d11 is enabled to be greater than or equal to the third distance threshold, so that it can be ensured that sufficient safe distances are reserved between the bypass path and the edge of the road and between the bypass path and the obstacle area, for the target vehicle to drive. It should be understood that shortest distances between the intermediate points and the obstacle area may be equal or unequal. This is not limited in this embodiment of this application.

In this embodiment of this application, both the minimum turning radius of the target vehicle and the width W of the target vehicle may be fixed values prestored in the automated parking apparatus. Alternatively, the automated parking apparatus may determine the minimum turning radius and the width W of the target vehicle based on a vehicle type of the target vehicle. For example, the automated parking apparatus may determine the vehicle type of the target vehicle based on an automated parking request reported by the target vehicle, or the automated parking apparatus may identify the vehicle type of the target vehicle based on the image captured by the visual sensor.

Figure 26:
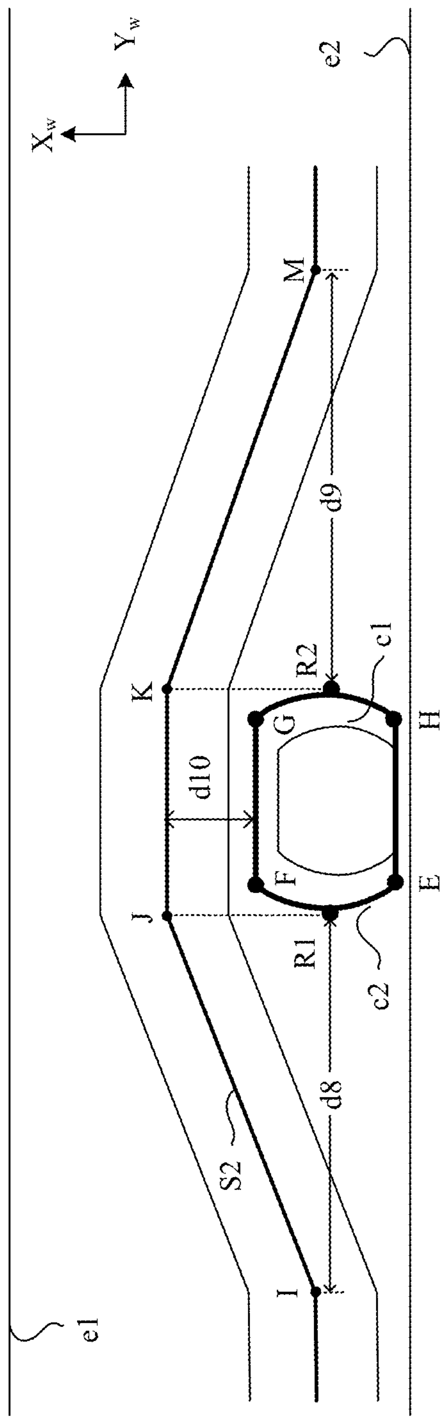
FIG. 26 is a schematic diagram of another bypass path according to an embodiment of this application.

In a possible example, refer to FIG. 24 and FIG. 26. The bypass path planned by the automated parking apparatus may include two intermediate points: a first intermediate point J and a second intermediate point K. A connection line between the first intermediate point J and the first vertex of the obstacle area c2 is parallel to the width direction (namely, the Xw-axis direction) of the road, and a connection line between the second intermediate point K and the second vertex of the obstacle area c2 is parallel to the width direction of the road. The first vertex is a vertex that is closest to the start point I and that is in the obstacle area c2, and the second vertex is a vertex that is closest to the end point M and that is in the obstacle area c2.

For example, as shown in FIG. 24, it is assumed that the obstacle area c2 is a rectangular area, and a long side of the rectangular area is parallel to the Yw-axis direction. In this case, the first vertex of the obstacle area c2 may be a vertex E or a vertex F, and the second vertex of the obstacle area c2 may be a vertex G or a vertex H. Alternatively, refer to FIG. 26. It is assumed that both the side EF and the side GH of the obstacle area c2 are arc-shaped, the arc-shaped side EF is close to the start point I, and the arc-shaped side GH is close to the end point M. In this case, the first vertex R1 may be located on the arc-shaped side EF, and the second vertex R2 may be located on the arc-shaped side GH.

Two intermediate points are determined between the start point and the end point of the bypass path, so that inflection points of the bypass path can be minimized while it is ensured that the target vehicle reliably bypasses the obstacle, to reduce a quantity of times that the target vehicle adjusts a vehicle posture.

In some embodiments, in this embodiment of this application, to facilitate planning of the bypass path, as shown in FIG. 17 and FIG. 22, two opposite sides (for example, the side BC and the side AD in FIG. 17, and a side QB and a side AP in FIG. 22) that are of the initial area c1 and that are determined by the automated parking apparatus may be parallel to the length direction of the road, that is, the Yw-axis direction. Correspondingly, the obstacle area c2 determined based on the initial area c1 also includes two opposite sides parallel to the Yw-axis direction. For example, the obstacle area c2 includes the side FG and the side EH shown in FIG. 24 and FIG. 26.

It may be understood that, for a scenario in which the obstacle area c2 includes the two sides parallel to the Yw-axis direction, a connection line between the two intermediate points J and K that are determined based on the obstacle area c2 is also parallel to the Yw-axis direction. To be specific, Xw-axis coordinates of the intermediate point J and the intermediate point K may be equal, or it may be understood as follows: A shortest distance between the intermediate point J and the obstacle area c2 is equal to a shortest distance between the intermediate point K and the obstacle area c2.

The following uses FIG. 24 as an example to describe a process of determining the bypass path. Refer to FIG. 24. The automated parking apparatus may determine the start point I, the two intermediate points J and K, and the end point M based on the obstacle area c2. The intermediate point J is located on a perpendicular line from the point F to the first edge e1 of the road, and a distance between the intermediate point J and the first edge e1 is equal to the third distance threshold, that is, equal to (W/2+d). The intermediate point K is located on a perpendicular line from the point G to the first edge e1 of the road, and a distance between the intermediate point K and the first edge e1 is equal to the third distance threshold, that is, is equal to (W/2+d). In addition, a distance between the intermediate point J and the point F needs to be greater than W/2, and a distance between the intermediate point K and the point G also needs to be greater than W/2.

Based on distance requirements that need to be met by the intermediate points J and K, it can be learned that, if the width of the road is L, when the largest width z of the initial area c1 occupied by the obstacle meets $z \le L-W-2d$, the target vehicle may bypass the obstacle. Alternatively, when the largest width z of the initial area c1 meets $z > L-W-2d$, the automated parking apparatus may determine that the target vehicle cannot bypass the obstacle, and may further replan a driving path for the target vehicle.

For example, it is assumed that L=6 m, W=2 m, and d=0.5 m. In this case, when z≤3 m, the target vehicle may bypass the obstacle, or when z>3 m, the target vehicle cannot bypass the obstacle.

Refer to FIG. 24. It can be learned that if the largest width z of the initial area c1 meets z≤L−W−2d, a driving area of the target vehicle may be obtained by separately extending W/2 towards the two edges of the road by using the bypass path S2 as a center line. The driving area does not overlap the obstacle area c2.

In some embodiments, in this embodiment of this application, after determining the start point, the at least one intermediate point, and the end point, the automated parking apparatus can further perform, at an interval of a target length, interpolation processing on a track formed by sequentially connecting the start point, the at least one intermediate point, and the end point, to obtain coordinates of each track point in the bypass path. In other words, the bypass path may be represented by using the coordinates of each track point. The coordinates of each track point include an Xw-axis coordinate and a Yw-axis coordinate, and a distance between two adjacent track points may be equal to the target length. An order of magnitude of the target length may be a centimeter level. For example, the target length may be 10 centimeters or 20 cm. In this way, centimeter-level path planning can be implemented.

In some embodiments, the automated parking apparatus may further perform filtering processing on the track formed by sequentially connecting the start point, the at least one intermediate point, and the end point, to obtain the bypass path. Therefore, it can be ensured that the bypass path is smooth, thereby ensuring that the target vehicle drives more smoothly. For example, the automated parking apparatus may perform, by using a Kalman filtering algorithm, filtering processing on the track formed by sequentially connecting the points, to obtain the bypass path.

It may be understood that the automated parking apparatus may alternatively not perform a filtering processing operation, that is, the automated parking apparatus may directly send, to the target vehicle as the bypass path, the track formed by sequentially connecting the start point, the at least one intermediate point, and the end point. Then, the target vehicle performs filtering processing on the bypass path.

Operation 108: Send the bypass path to the target vehicle.

After determining the bypass path, the automated parking apparatus may send the bypass path to the target vehicle. The bypass path indicates the target vehicle to bypass the obstacle. For example, the automated parking apparatus may send the coordinates of each track point in the bypass path to the target vehicle. After receiving the bypass path, the target vehicle may automatically adjust a vehicle posture based on the bypass path, to bypass the obstacle.

Figure 25:
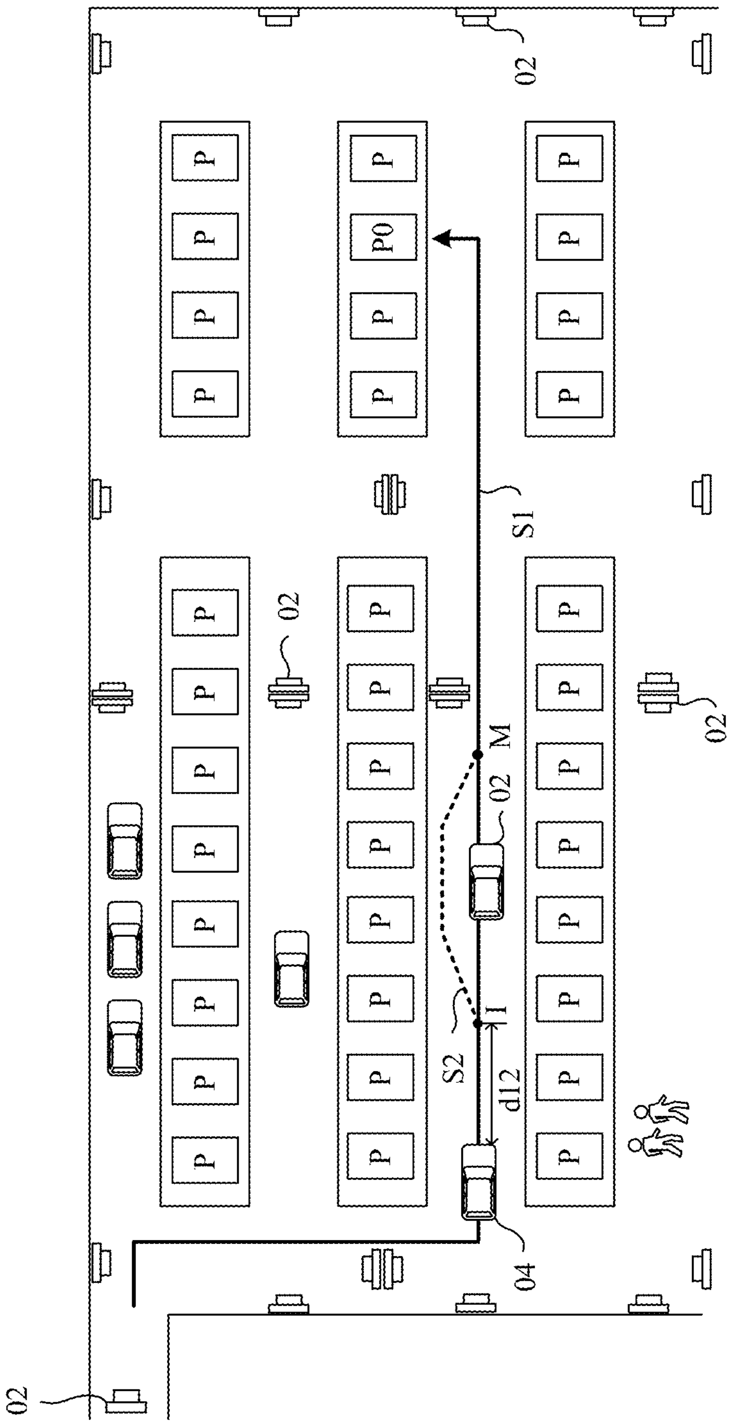
FIG. 25 is another top view of a parking domain according to an embodiment of this application.

In some embodiments, refer to FIG. 25. The automated parking apparatus may send the bypass path to a target vehicle 04 before a distance d12 between the target vehicle 04 and the start point I of the bypass path S2 is less than a fifth distance threshold. The bypass path S2 is delivered in advance, so that it can be ensured that the target vehicle has sufficient time to adjust a vehicle posture, thereby ensuring that the target vehicle can smoothly bypass the obstacle. The fifth distance threshold may be a fixed value prestored in the automated parking apparatus, and the fifth distance threshold may be greater than the first distance threshold, that is, greater than the minimum turning radius of the target vehicle.

Figure 27:
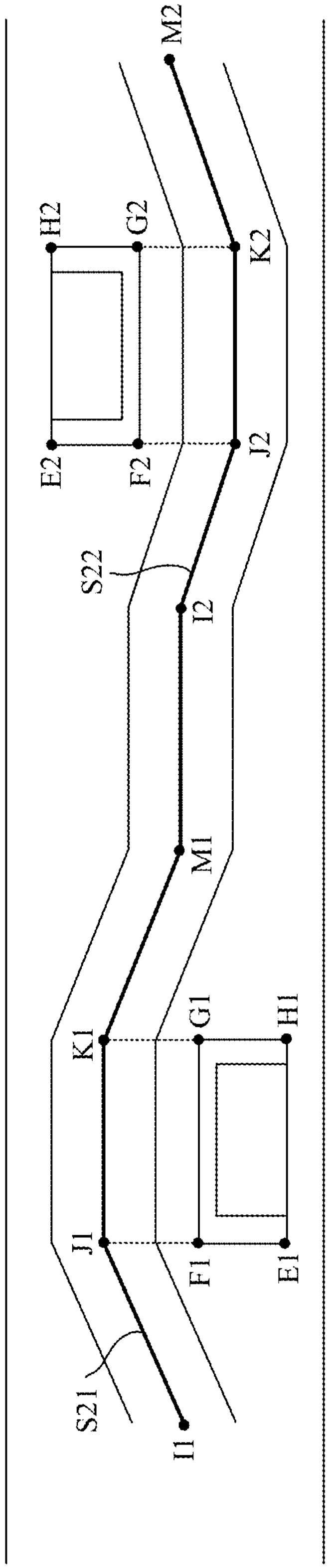
FIG. 27 is a schematic diagram of still another bypass path according to an embodiment of this application.

It may be understood that, refer to FIG. 27. If the automated parking apparatus detects that there are a plurality of obstacles on the initial driving path, the automated parking apparatus may determine a bypass path based on an obstacle area in which each obstacle is located, and separately deliver a plurality of determined bypass paths to the target vehicle. Alternatively, the automated parking apparatus may determine one bypass sub-path based on an obstacle area in which each obstacle is located, use a track formed by sequentially connecting a plurality of determined bypass sub-paths as a bypass path, and deliver the bypass path to the target vehicle.

For example, as shown in FIG. 27, the automated parking apparatus may determine a bypass sub-path S21 based on a first obstacle area, that is, a rectangular area enclosed by sequentially connecting a point E1, a point F1, a point G1, and a point H1. The bypass sub-path S21 is a path formed by sequentially connecting a start point I1, an intermediate point J1, an intermediate point K1, and an end point M1. The automated parking apparatus may further determine a bypass sub-path S22 based on a second obstacle area, that is, a rectangular area enclosed by sequentially connecting a point E2, a point F2, a point G2, and a point H2. The bypass sub-path S22 is a path formed by sequentially connecting a start point 12, an intermediate point J2, an intermediate point K2, and an end point M2. The automated parking apparatus may use a track formed by sequentially connecting the two bypass sub-paths S21 and S22 as a bypass path and deliver the bypass path to the target vehicle.

It may be further understood that, if there are a plurality of obstacles on the initial driving path, there may be a scenario in which a distance between two adjacent bypass sub-paths determined by the automated parking apparatus is short or two adjacent bypass sub-paths overlap, that is, a scenario in which a distance between an end point of one bypass sub-path and a start point of another bypass sub-path is short, or an end point of one bypass sub-path is located before a start point of the another bypass sub-path. In the foregoing scenario, the automated parking apparatus may further delete the end point of one bypass sub-path and/or the start point of the another bypass sub-path.

For example, as shown in FIG. 27, if a distance between the end point M1 and the start point 12 is short, the automated parking apparatus may delete one of the end point M1 and the start point 12. Alternatively, both the end point M1 and the start point 12 may be deleted. In this case, in the bypass path determined by the automated parking apparatus, a track between the intermediate point K1 and the intermediate point J2 is a straight line. In addition, a distance between the two intermediate points K1 and J2 needs to be greater than the first distance threshold, that is, greater than the minimum turning radius of the target vehicle.

Refer to operation 104. It may be further understood that the automated parking apparatus may directly send the bypass path to the target vehicle. Alternatively, the automated parking apparatus may send the bypass path to a mobile terminal associated with the target vehicle, and then the mobile terminal delivers the bypass path to the target vehicle.

For a scenario in which the automated parking apparatus includes the management cloud platform 011 and the lot server 012, refer to FIG. 3 and FIG. 12. The automated parking apparatus may first send the bypass path to the target vehicle 04 through the first communication link between the cloud platform 011 and the target vehicle. If it is detected that the first communication link is faulty, the bypass path may be sent to the target vehicle 04 through the second communication link between the lot server 012 and the target vehicle 04. Therefore, reliable delivery of the bypass path can be ensured.

It may be further understood that, when image calibration is performed on the visual sensor, both the Xw-axis and the Yw-axis of the world coordinate system that are set by the automated parking apparatus may be determined based on the extension direction of the road on which the visual sensor is deployed. Extension directions of different roads may be different. Therefore, after determining world coordinates that are of each track point on the initial driving path or the bypass path and that are on the road to which the track point belongs, the automated parking apparatus may further convert the world coordinates of each track point into coordinates in a unified target world coordinate system. Then, the automated parking apparatus delivers the converted coordinates of each track point in the target world coordinate system to the target vehicle.

Operation 109: Send the bypass path to the mobile terminal associated with the target vehicle.

For a scenario in which the automated parking apparatus directly sends the initial driving path and the bypass path to the target vehicle, to ensure that a vehicle owner of the target vehicle learns a bypass status of the target vehicle in a timely manner, after determining the bypass path, the automated parking apparatus may further send a bypass reminder to the mobile terminal associated with the target vehicle.

Figure 28:
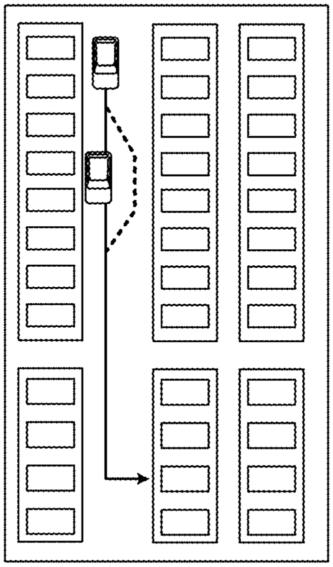
FIG. 28 is a schematic diagram of a display interface of a mobile terminal according to an embodiment of this application.

After receiving the bypass reminder, the mobile terminal may display the bypass reminder on a display interface of the mobile terminal. The bypass reminder includes at least the bypass path. As shown in FIG. 28, the mobile terminal may display the bypass path. It may be understood that the bypass reminder may further include a prompt text, and the prompt text may indicate that the target vehicle is bypassing. For example, the prompt text may be that "The vehicle is bypassing in a narrow area".

Figure 29:
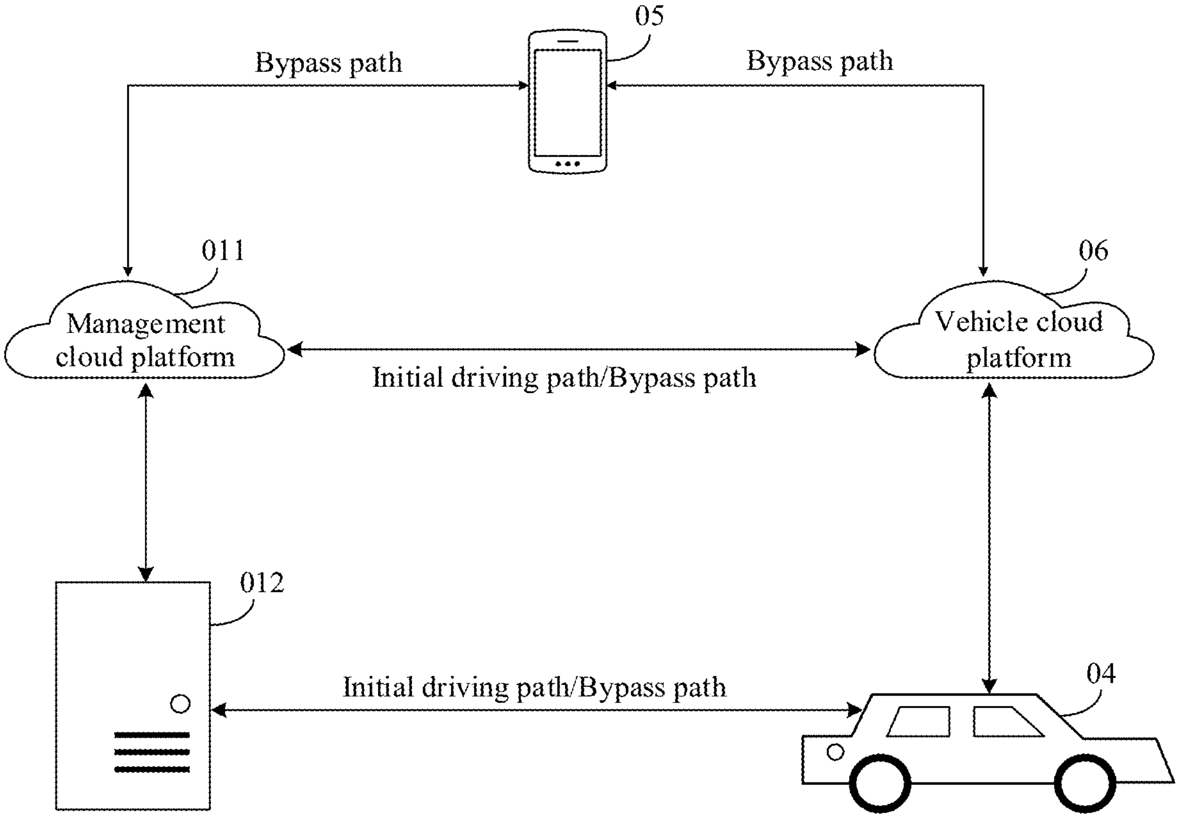
FIG. 29 is a schematic diagram of a structure of still yet another automated parking system according to an embodiment of this application.
Figure 30:
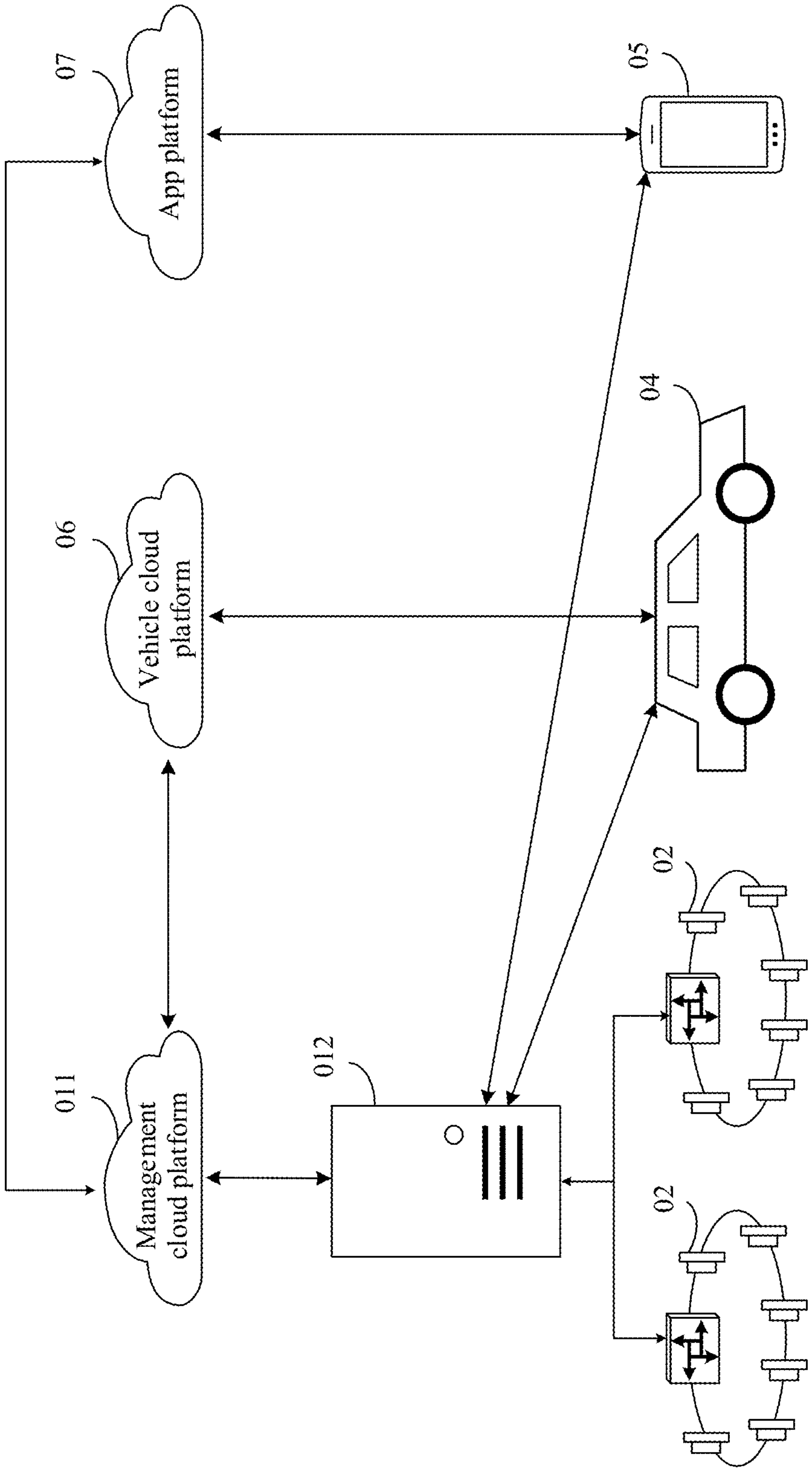
FIG. 30 is a schematic diagram of a structure of further another automated parking system according to an embodiment of this application.

In some embodiments, as shown in FIG. 29, the automated parking apparatus (for example, the management cloud platform 011) may directly send the bypass path to a mobile terminal 05. Alternatively, the automated parking apparatus may send the bypass path to a vehicle cloud platform 06, and then the vehicle cloud platform 06 sends the bypass path to a mobile terminal 05. Alternatively, refer to FIG. 30. The automated management apparatus may further establish a communication connection to an application (application, APP) platform 07. The automated parking apparatus may send the bypass path to the APP platform 07, and then the APP platform 07 sends the bypass path to a mobile terminal 05. The APP platform 07 may be a background management platform of a vehicle management APP installed on the mobile terminal 05.

Figure 31:
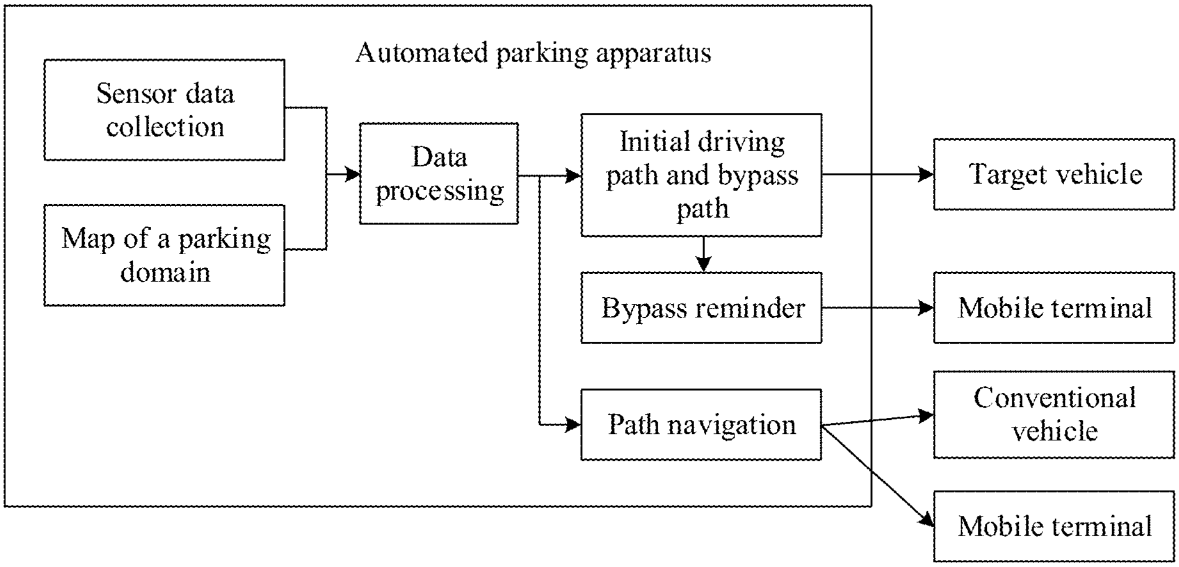
FIG. 31 is a schematic diagram of a function of an automated parking apparatus according to an embodiment of this application.

Refer to FIG. 31. With reference to the foregoing descriptions of operation 101 to operation 109, it can be learned that the automated parking apparatus provided in this embodiment of this application may obtain the data collected by the sensor, and may process the obtained data and the map of the parking domain, to plan the initial driving path and the bypass path for the target vehicle. The automated parking apparatus may deliver the planned path to the target vehicle, for example, to a computing unit of the target vehicle. In addition, after planning the bypass path, the automated parking apparatus may send the bypass reminder to the mobile terminal associated with the target vehicle.

It may be understood that, as shown in FIG. 31, the automated parking apparatus may further plan a navigation path for a conventional vehicle (namely, a vehicle having no automated driving function), and deliver the navigation path to the conventional vehicle, so that the conventional vehicle displays the navigation path on an HMI interface of the conventional vehicle. Alternatively, the automated parking apparatus may deliver the navigation path to a mobile terminal associated with the conventional vehicle, so that the mobile terminal displays the navigation path on a display interface of the mobile terminal. For a method for planning the navigation path by the automated parking apparatus, refer to the foregoing operation 101 to operation 107. Details are not described herein again.

In some embodiments, the automated parking apparatus may superimpose the navigation path on the map of the parking domain, and deliver the navigation path to the conventional vehicle or the mobile terminal. In addition, in addition to delivering the bypass path, the automated parking apparatus may further superimpose, on a map, information such as a location of the vehicle, a location of the obstacle, and a size of the obstacle, and deliver the information to the conventional vehicle or the mobile terminal. This can help the conventional vehicle or the mobile terminal present and update the location of the vehicle, the navigation path, and the location of the obstacle in real time, to implement precise navigation and safety prompt and warning, so that running efficiency of a parking domain is effectively improved, and user experience is improved.

It may be further understood that an execution sequence of the operations in the automated parking method provided in this embodiment of this application may be adjusted based on a situation, and operations may be added or deleted based on a situation. For example, if the automated parking request carries an identifier of a parking space, operation 102 may be deleted based on a situation, that is, the automated parking apparatus may directly determine the parking space indicated by the identifier as the target parking space. Alternatively, operation 106 may be deleted based on a situation, that is, the automated parking apparatus may directly use the initial area as the obstacle area, to plan the bypass path. Alternatively, operation 109 may be performed before operation 108. Alternatively, operation 109 may be deleted based on a situation.

In conclusion, this embodiment of this application provides an automated parking method. The automated parking apparatus can plan the initial driving path and the bypass path for the vehicle. Therefore, the vehicle does not need to plan a driving path, and further, a large quantity of high-precision sensors do not need to be disposed in the vehicle, thereby effectively reducing costs of the vehicle. In addition, compared with a vehicle that plans a path while performing detection, the automated parking apparatus can determine a road traffic status in the entire parking domain, and can further plan a global initial driving path for the vehicle, so that path planning efficiency is effectively improved, and parking efficiency is further improved.

In addition, when detecting an obstacle, the automated parking apparatus may further plan and deliver a bypass path in advance. Therefore, it can be ensured that the vehicle can bypass the obstacle in a timely manner, to reach a target parking space, thereby effectively improving a parking success rate. In addition, the bypass path is delivered in advance, so that the vehicle can adjust a vehicle posture in advance without parking, thereby effectively improving driving efficiency.

It can be learned with reference to the foregoing analysis that the automated parking method provided in this embodiment of this application includes at least the following beneficial effects.

1. A field-side service is provided, and the field-side service can perform real-time monitoring and over-the-horizon sensing on a path in front of a vehicle, and provide global path planning and obstacle avoidance policies. In one aspect, sensor deployment on a vehicle side can be effectively reduced, and costs on the vehicle side can be reduced. For example, only low-cost sensors such as a wheel speedometer, a surround-view camera, and an ultrasonic radar need to be deployed on the vehicle side. In another aspect, a problem that reliability of a planned path is low because a field of view of the vehicle in a parking domain is limited or blocked, and accordingly, the vehicle can only obtain partial information, and has insufficient understanding for a global road condition and a driving road condition is resolved. In still another aspect, a problem that driving efficiency is low because the vehicle can only perform path adjustment while performing detection and cannot generate a driving policy at a time is resolved.
2. A bypass path is delivered in advance, so that a problem that driving efficiency is affected because the vehicle needs to park before bypassing is resolved.
3. A problem that a field-side solution in a related technology lacks bypass path planning is resolved. In the field-side solution in the related technology, if there is an obstacle in a driving path, the vehicle can only be braked to wait for the obstacle to be removed, or to wait for a user to remotely operate the vehicle. A field-side service provided in this embodiment of this application can plan and deliver a bypass path, so that the vehicle can automatically bypass an obstacle, and the bypass process does not require manual participation.
4. According to the solution provided in this embodiment of this application, a path navigation service can be further provided for a conventional vehicle in a parking domain (for example, a parking lot), to resolve a rigid requirement problem of difficult parking, improve parking experience of a user, and improve running efficiency of the parking domain.
5. A bypass reminder service is provided for the user, so that the user can learn a driving status of the vehicle in a timely manner.

Figure 32:
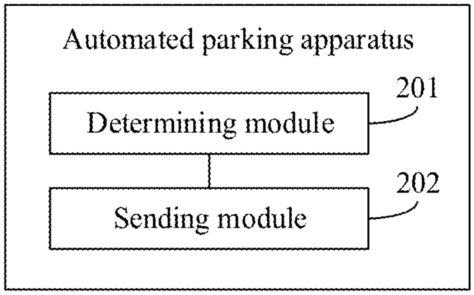
FIG. 32 is a schematic diagram of a structure of an automated parking apparatus according to an embodiment of this application.

An embodiment of this application further provides an automated parking apparatus. The automated parking apparatus may be applied to a parking domain, and may be configured to implement the automated parking method provided in the foregoing method embodiment. As shown in FIG. 32, the apparatus includes the following components.

A determining module 201 is configured to: determine, in the parking domain based on a road traffic status in the parking domain, an initial location of a target vehicle, and a location of a target parking space of the target vehicle, an initial driving path from the initial location to the target parking space.

For implementation of a function of the determining module 201, refer to related descriptions of operation 103 in the foregoing method embodiment.

A sending module 202 is configured to send the initial driving path to the target vehicle, where the initial driving path indicates the target vehicle to drive from the initial location to the target parking space. For implementation of a function of the sending module 202, refer to related descriptions of operation 104 in the foregoing method embodiment.

The determining module 201 may be further configured to: if it is detected that there is an obstacle on the initial driving path, determine a bypass path based on an obstacle area in which the obstacle is located, where the bypass path does not overlap the obstacle area. For implementation of a function of the determining module 201, further refer to related descriptions of operation 107 in the foregoing method embodiment.

The sending module 202 may be further configured to send the bypass path to the target vehicle, where the bypass path indicates the target vehicle to bypass the obstacle. For implementation of a function of the sending module 202, further refer to related descriptions of operation 108 in the foregoing method embodiment.

In some embodiments, the determining module 201 may be configured to separately determine a start point, an end point, and at least one intermediate point of the bypass path based on the obstacle area.

Both the start point and the end point are located on the initial driving path, and both a shortest distance between the start point and the obstacle area and a shortest distance between the end point and the obstacle area are greater than or equal to a first distance threshold. Each intermediate point is located outside the initial driving path, a shortest distance between each intermediate point and the obstacle area is greater than or equal to a second distance threshold, and a shortest distance between each intermediate point and an edge of a road on which the obstacle is located is greater than or equal to a third distance threshold.

In some embodiments, the at least one intermediate point includes a first intermediate point and a second intermediate point. A connection line between the first intermediate point and a first vertex of the obstacle area is parallel to a width direction of the road, and a connection line between the second intermediate point and a second vertex of the obstacle area is parallel to the width direction of the road. The first vertex is a vertex that is closest to the start point and that is in the obstacle area, and the second vertex is a vertex that is closest to the end point and that is in the obstacle area.

In some embodiments, the determining module 201 may be further configured to perform filtering processing on a track formed by sequentially connecting the start point, the at least one intermediate point, and the end point, to obtain the bypass path.

In some embodiments, the second distance threshold is greater than or equal to W/2, and the third distance threshold is greater than or equal to (W/2+d), where W is a width of the target vehicle, and d is a safe distance threshold.

In some embodiments, the determining module 201 may be further configured to: before determining the bypass path based on the obstacle area in which the obstacle is located, determine an initial area occupied by the obstacle on the road; and determine the obstacle area based on the initial area, where the initial area is located within the obstacle area, a distance between a target boundary of the obstacle area and a target boundary of the initial area is greater than or equal to the safe distance threshold, and the bypass path is located on a side that is of the target boundary of the obstacle area and that is away from the target boundary of the initial area. For implementation of a function of the determining module 201, further refer to related descriptions of operation 105 and operation 106 in the foregoing method embodiment.

In some embodiments, a shortest distance between the initial area and a first edge of the road is greater than a shortest distance between the initial area and a second edge of the road, and the bypass path is located between the target boundary of the obstacle area and the first edge.

In some embodiments, the determining module 201 may be configured to:

determine, based on an image that includes the obstacle and that is captured by the at least one visual sensor, the initial area occupied by the obstacle on the road.

Figure 33:
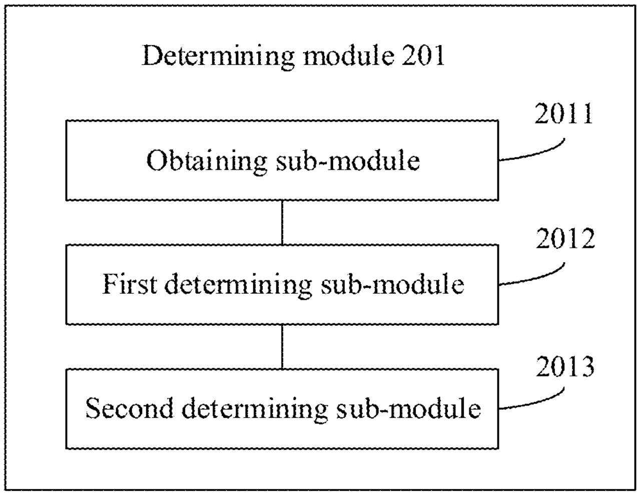
FIG. 33 is a schematic diagram of a structure of a determining module according to an embodiment of this application.

In some embodiments, as shown in FIG. 33, the determining module 201 may include the following components.

An obtaining sub-module 2011 is configured to obtain a first image that includes the obstacle and that is captured by a first visual sensor, and a second image that includes the obstacle and that is captured by a second visual sensor, where the first visual sensor and the second visual sensor are arranged in an extension direction of the road, and are separately located on two sides of the obstacle.

For implementation of a function of the obtaining sub-module 2011, refer to related descriptions of operation 1051 in the foregoing method embodiment.

A first determining sub-module 2022 is configured to: determine, in the first image by using an object detection algorithm, a first detection box including the obstacle; and determine, in the second image, a second detection box including the obstacle. For implementation of a function of the first determining sub-module 2022, refer to related descriptions of operation 1052 in the foregoing method embodiment.

A second determining sub-module 2023 is configured to: determine, based on coordinates of the first detection box in a pixel coordinate system, coordinates of the second detection box in the pixel coordinate system, and a conversion relationship between the pixel coordinate system and a world coordinate system, the initial area occupied by the obstacle on the road. For implementation of a function of the second determining sub-module 2023, refer to related descriptions of operation 1053 in the foregoing method embodiment.

In some embodiments, both the first detection box and the second detection box are rectangular detection boxes, and the second determining sub-module 2023 may be configured to:

determine, based on coordinates of a first vertex and a second vertex of the first detection box in the pixel coordinate system and the conversion relationship between the pixel coordinate system and the world coordinate system, a first locating point and a second locating point that respectively correspond to the first vertex and the second vertex of the first detection box and that are in the world coordinate system;

determine, based on coordinates of a first vertex and a second vertex of the second detection box in the pixel coordinate system and the conversion relationship between the pixel coordinate system and the world coordinate system, a third locating point and a fourth locating point that respectively correspond to the first vertex and the second vertex of the second detection box and that are in the world coordinate system; and determine, based on the first locating point, the second locating point, the third locating point, and the fourth locating point, the initial area occupied by the obstacle on the road, where the first vertex and the second vertex of the first detection box are two vertices that are in four vertices of the first detection box and that are close to the road, and the first vertex and the second vertex of the second detection box are two vertices that are in four vertices of the second detection box and that are close to the road.

For implementation of a function of the second determining sub-module 2023, refer to related descriptions of operation 10531 to operation 10533 in the foregoing method embodiment.

In some embodiments, the second determining sub-module 2023 may be configured to:

if a distance between the first locating point and the fourth locating point is greater than a fourth distance threshold, and a distance between the second locating point and the third locating point is greater than the fourth distance threshold, determine, as the initial area, a rectangular area enclosed by sequentially connecting the first locating point, the second locating point, the third locating point, and the fourth locating point; or if a distance between the first locating point and the fourth locating point is less than or equal to a fourth distance threshold, and a distance between the second locating point and the third locating point is less than or equal to the fourth distance threshold, determine a fifth locating point and a sixth locating point based on the first locating point and the second locating point, and determine, as the initial area, an area enclosed by sequentially connecting the first locating point, the fifth locating point, the second locating point, and the sixth locating point; where a first coordinate of the fifth locating point is equal to a first coordinate of the first locating point, a second coordinate of the fifth locating point is equal to a second coordinate of the second locating point, a first coordinate of the sixth locating point is equal to a first coordinate of the second locating point, and a second coordinate of the sixth locating point is equal to a second coordinate of the first locating point;

both a connection line between the first locating point and the fifth locating point and a connection line between the second locating point and the sixth locating point in the initial area are straight lines, both a connection line between the first locating point and the sixth locating point and a connection line between the second locating point and the fifth locating point are arcs, and a circle center of the arc is a center point of a rectangle that uses the first locating point, the second locating point, the fifth locating point, and the sixth locating point as vertices; and a coordinate axis of the first coordinate is parallel to the width direction of the road, and a coordinate axis of the second coordinate is perpendicular to the coordinate axis of the first coordinate, and is parallel to the extension direction of the road.

In some embodiments, the sending module 202 may be configured to: send the bypass path to the target vehicle before a distance between the target vehicle and the start point of the bypass path is less than a fifth distance threshold.

In some embodiments, the determining module 201 may be further configured to: before determining the initial driving path, determine the target parking space based on a parking space occupation status in the parking domain. For implementation of a function of the determining module 201, further refer to related descriptions of operation 102 in the foregoing method embodiment.

In some embodiments, the sending module 202 may be configured to: send the bypass path to a mobile terminal associated with the target vehicle. For implementation of a function of the sending module 202, further refer to related descriptions of operation 109 in the foregoing method embodiment.

In some embodiments, the sending module 202 may be configured to: send the initial driving path to the target vehicle through a first communication link between a management cloud platform and the target vehicle; or if the first communication link is faulty, send the initial driving path to the target vehicle through a second communication link between a lot server and the target vehicle; and send the bypass path to the target vehicle through the first communication link between the management cloud platform and the target vehicle; or if the first communication link is faulty, send the bypass path to the target vehicle through the second communication link between the lot server and the target vehicle In conclusion, this embodiment of this application provides an automated parking apparatus. The automated parking apparatus can plan the initial driving path and the bypass path for the vehicle. Therefore, the vehicle does not need to plan a driving path, and further, a large quantity of high-precision sensors do not need to be disposed in the vehicle, thereby effectively reducing costs of the vehicle. In addition, compared with a vehicle that plans a path while performing detection, the automated parking apparatus can determine a road traffic status in the entire parking domain, and can further plan a global initial driving path for the vehicle, so that path planning efficiency is effectively improved, and parking efficiency is further improved.

In addition, when detecting an obstacle, the automated parking apparatus may further plan and deliver a bypass path in advance. Therefore, it can be ensured that the vehicle can bypass the obstacle in a timely manner, to reach a target parking space, thereby effectively improving a parking success rate. In addition, the bypass path is delivered in advance, so that the vehicle can adjust a vehicle posture in advance without parking, thereby effectively improving driving efficiency.

It may be clearly understood by a person skilled in the art that, for the purpose of convenient and brief description, for a detailed working process of the foregoing automated parking apparatus and each module, refer to a corresponding process in the foregoing method embodiment. Details are not described herein again.

It should be understood that the automated parking apparatus provided in embodiments of this application may be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. Certainly, the functions of the foregoing automated parking apparatus may alternatively be implemented by using software. When the functions of the automated parking apparatus are implemented by using software, the modules in the automated parking apparatus may alternatively be software modules.

Figure 34:
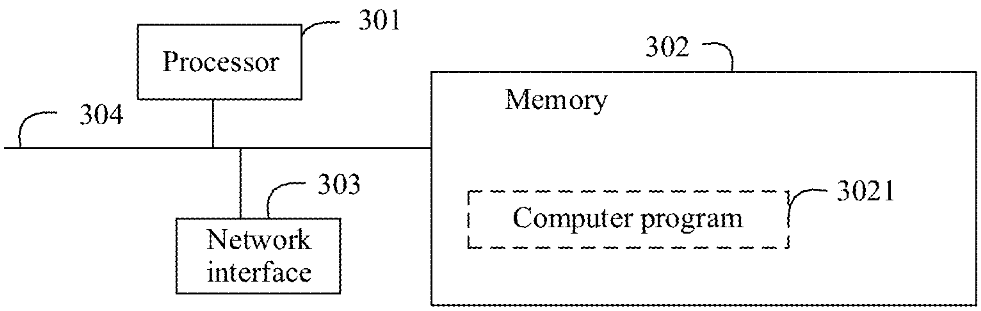
FIG. 34 is a schematic diagram of a structure of another automated parking apparatus according to an embodiment of this application.

FIG. 34 is a schematic diagram of a structure of an automated parking apparatus according to an embodiment of this application. The automated parking apparatus may be applied to a parking domain, and may be configured to implement the automated parking method provided in the foregoing method embodiment. Refer to FIG. 34. The automated parking apparatus may include a processor 301, a memory 302, a network interface 303, and a bus 304. The bus 304 is configured to connect the processor 301, the memory 302, and the network interface 303. A communication connection to another device may be implemented through the network interface 303 (which may be wired or wireless). The memory 302 stores a computer program 3021, and the computer program 3021 is used to implement various application functions.

It should be understood that, in embodiments of this application, the processor 301 may be a CPU, or the processor 301 may be another general-purpose processor, a digital signal processor (DSP), an application-specific integrated circuit (ASIC), a field-programmable gate array (FPGA), a GPU or another programmable logic device, a discrete gate or transistor logic device, a discrete hardware component, or the like. The general-purpose processor may be a microprocessor, any conventional processor, or the like.

The memory 302 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In addition to a data bus, the bus 304 may further include a power bus, a control bus, a status signal bus, and the like. However, for clear description, various types of buses in the figure are marked as the bus 304.

The processor 301 is configured to execute the computer program stored in the memory 302, and the processor 301 executes the computer program 3021 to implement the automated parking method provided in the foregoing method embodiment.

An embodiment of this application further provides another automated parking apparatus. The automated parking apparatus may include a programmable logic circuit and/or program instructions. The automated parking apparatus may be configured to implement the automated parking method provided in the foregoing method embodiment.

An embodiment of this application further provides a computer-readable storage medium. The computer-readable storage medium stores instructions. The instructions are executed by a processor, to implement the automated parking method provided in the foregoing method embodiment.

An embodiment of this application further provides a computer program product including instructions. When the computer program product runs on a computer, the computer is enabled to perform the automated parking method provided in the foregoing method embodiment.

An embodiment of this application further provides an automated parking system. Refer to FIG. 1 to FIG. 3, FIG. 12, FIG. 29, and FIG. 30. The automated parking system includes the automated parking apparatus 01 and the plurality of sensors 02 disposed in the parking domain.

The automated parking apparatus 01 may be the automated parking apparatus provided in the foregoing embodiment, for example, may be the apparatus shown in FIG. 32 or FIG. 34. In addition, the automated parking apparatus may include the determining module shown in FIG. 33.

The plurality of sensors 02 may include at least one of a visual sensor and a radar. The visual sensor may be a camera, for example, a monocular camera or a binocular camera. The radar may be a millimeter-wave radar, a lidar, an ultrasonic radar, or the like.

The automated parking apparatus 01 may plan the initial driving path and the bypass path for the target vehicle in the parking domain based on the data collected by the plurality of sensors 02, and deliver the planned path to the target vehicle, to indicate the target vehicle to drive to the target parking space. The target vehicle may be a vehicle having at least a semi-automated driving (namely, L2-level automated driving) function. For example, the target vehicle may be a vehicle having an AVP function.

All or some of the automated parking method provided in the foregoing embodiments may be implemented by using software, hardware, firmware, or any combination thereof. When software is used to implement embodiments, all or some of the automated parking method provided in the foregoing embodiments may be implemented in a form of a computer program product. The computer program product includes at least one computer instruction. When the computer program instructions are loaded or executed on a computer, all or some of the processes or the functions according to the method embodiment of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center that includes at least one usable medium set. The usable medium may be a magnetic medium (for example, a floppy disk, a hard disk, or a magnetic tape), an optical medium (for example, a DVD), or a semiconductor medium. The semiconductor medium may be a solid state drive (SSD).

In this application, the terms "first", "second", and the like are used to distinguish between same or similar items whose effects and functions are basically the same. It should be understood that there is no logical or time-sequence dependency among "first", "second", and "n$^{th}$", and a quantity and an execution sequence are not limited.

In this application, a term "at least one" means at least one, and a term "a plurality of" means two or more. The terms "system" and "network" may be used interchangeably in this specification. It should be understood that "and/or" mentioned in this specification represents that there may be three relationships. For example, A and/or B may represent the following three cases: Only A exists, both A and B exist, and only B exists. A character "/" generally represents an "or" relationship between the associated objects.

The foregoing descriptions are merely embodiments of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. An automated parking method, comprising:

determining, in a parking domain based on a road traffic status in the parking domain, an initial location of a target vehicle, and a location of a target parking space of the target vehicle, an initial driving path from the initial location to the target parking space;

sending, to the target vehicle, the initial driving path indicating the target vehicle to drive from the initial location to the target parking space;

if it is detected that there is an obstacle on the initial driving path:

determining, by a processor, an initial area occupied by the obstacle, wherein determining the initial area comprises at least one of:

determining, as the initial area, a rectangular area enclosed by sequentially connecting a first locating point, a second locating point, a third locating point, and a fourth locating point, wherein the first locating point and the second locating point are based on a first detection box corresponding to the obstacle, and the third locating point and the fourth locating point are based on a second detection box corresponding to the obstacle, wherein the first detection box is determined from a first image comprising the obstacle and the second detection box is determined from a second image comprising the obstacle; or determining, as the initial area, an area enclosed by sequentially connecting the first locating point, the second locating point, a fifth locating point, and a sixth locating point, wherein a distance between the first locating point and the fourth locating point is less than or equal to a fourth distance threshold, a distance between the second locating point and the third locating point is less than or equal to the fourth distance threshold, and the fifth location point and the sixth locating point are computed from the first locating point and the second locating point;

determining, by the processor, an obstacle area based on the initial area occupied by the obstacle and located within the obstacle area, wherein a distance between a target boundary of the obstacle area and a target boundary of the initial area is greater than or equal to a safe distance threshold, and wherein the obstacle area is obtained by extending the target boundary of the initial area based on the safe distance threshold; and determining, by the processor, a bypass path based on the obstacle area in which the obstacle is located, wherein the bypass path does not overlap the obstacle area and is located on a side that is of the target boundary of the obstacle area and that is away from the target boundary of the initial area;

sending, to the target vehicle, the bypass path indicating the target vehicle to bypass the obstacle; and controlling the target vehicle to bypass the obstacle based on the bypass path.

2. The method according to claim 1, wherein the determining the bypass path based on the obstacle area in which the obstacle is located comprises:

separately determining a start point, an end point, and at least one intermediate point of the bypass path based on the obstacle area, wherein both the start point and the end point are located on the initial driving path, and both a shortest distance between the start point and the obstacle area and a shortest distance between the end point and the obstacle area are greater than or equal to a first distance threshold; and each intermediate point is located outside the initial driving path, a shortest distance between each intermediate point and the obstacle area is greater than or equal to a second distance threshold, and a shortest distance between each intermediate point and an edge of a road on which the obstacle is located is greater than or equal to a third distance threshold.

3. The method according to claim 2, wherein the at least one intermediate point comprises a first intermediate point and a second intermediate point;

a connection line between the first intermediate point and a first vertex of the obstacle area is parallel to a width direction of the road, and a connection line between the second intermediate point and a second vertex of the obstacle area is parallel to the width direction of the road; and the first vertex is a vertex that is closest to the start point and that is in the obstacle area, and the second vertex is a vertex that is closest to the end point and that is in the obstacle area.

4. The method according to claim 2, wherein the determining the bypass path based on the obstacle area in which the obstacle is located further comprises:

performing a filtering processing on a track formed by sequentially connecting the start point, the at least one intermediate point, and the end point, to obtain the bypass path.

5. The method according to claim 2, wherein the second distance threshold is greater than or equal to W/2, and the third distance threshold is greater than or equal to (W/2+d), wherein W is a width of the target vehicle, and d is a safe distance threshold.

6. The method according to claim 1, wherein a shortest distance between the initial area and a first edge of the road is greater than a shortest distance between the initial area and a second edge of the road; and the bypass path is located between the target boundary of the obstacle area and the first edge.

7. The method according to claim 1, wherein a plurality of visual sensors are disposed in the parking domain; and the determining the initial area occupied by the obstacle on the road comprises:

determining, based on an image comprising the obstacle and captured by at least one visual sensor from the plurality of visual sensors, the initial area occupied by the obstacle on the road.

8. The method according to claim 7, wherein the determining, based on the image comprising the obstacle and captured by the at least one visual sensor, the initial area occupied by the obstacle on the road comprises:

obtaining the first image comprising the obstacle and captured by a first visual sensor, and the second image comprising the obstacle and captured by a second visual sensor, wherein the first visual sensor and the second visual sensor are arranged in an extension direction of the road, and are separately located on two sides of the obstacle;

determining, based on the first image, the first detection box comprising the obstacle, and determining, based on the second image, the second detection box comprising the obstacle; and determining, based on coordinates of the first detection box in a pixel coordinate system, coordinates of the second detection box in the pixel coordinate system, and a conversion relationship between the pixel coordinate system and a world coordinate system, the initial area occupied by the obstacle on the road.

9. The method according to claim 8, wherein both the first detection box and the second detection box are rectangular detection boxes; and the determining, based on coordinates of the first detection box in the pixel coordinate system, coordinates of the second detection box in the pixel coordinate system, and the conversion relationship between the pixel coordinate system and the world coordinate system, the initial area occupied by the obstacle on the road comprises:

determining, based on coordinates of a first vertex and a second vertex of the first detection box in the pixel coordinate system and the conversion relationship between the pixel coordinate system and the world coordinate system, the first locating point and the second locating point that respectively correspond to the first vertex and the second vertex of the first detection box and that are in the world coordinate system;

determining, based on coordinates of a first vertex and a second vertex of the second detection box in the pixel coordinate system and the conversion relationship between the pixel coordinate system and the world coordinate system, a third locating point and a fourth locating point that respectively correspond to the first vertex and the second vertex of the second detection box and that are in the world coordinate system; and determining, based on the first locating point, the second locating point, the third locating point, and the fourth locating point, the initial area occupied by the obstacle on the road, wherein the first vertex and the second vertex of the first detection box are two vertices that are in four vertices of the first detection box and that are close to the road, and the first vertex and the second vertex of the second detection box are two vertices that are in four vertices of the second detection box and that are close to the road.

10. The method according to claim 9, wherein the determining, based on the first locating point, the second locating point, the third locating point, and the fourth locating point, the initial area occupied by the obstacle on the road comprises:

in response to a distance between the first locating point and the fourth locating point is greater than a fourth distance threshold, and a distance between the second locating point and the third locating point is greater than the fourth distance threshold, determining, as the initial area, the rectangular area enclosed by sequentially connecting the first locating point, the second locating point, the third locating point, and the fourth locating point; or in response to the distance between the first locating point and the fourth locating point is less than or equal to the fourth distance threshold, and the distance between the second locating point and the third locating point is less than or equal to the fourth distance threshold, determining, as the initial area, the area enclosed by sequentially connecting the first locating point, the fifth locating point, the second locating point, and the sixth locating point, wherein a first coordinate of the fifth locating point is equal to a first coordinate of the first locating point, a second coordinate of the fifth locating point is equal to a second coordinate of the second locating point, a first coordinate of the sixth locating point is equal to a first coordinate of the second locating point, and a second coordinate of the sixth locating point is equal to a second coordinate of the first locating point;

both a connection line between the first locating point and the fifth locating point and a connection line between the second locating point and the sixth locating point in the initial area are straight lines, both a connection line between the first locating point and the sixth locating point and a connection line between the second locating point and the fifth locating point are arcs, and a circle center of the arc is a center point of a rectangle that uses the first locating point, the second locating point, the fifth locating point, and the sixth locating point as vertices; and a coordinate axis of the first coordinate is parallel to a width direction of the road, and a coordinate axis of the second coordinate is perpendicular to the coordinate axis of the first coordinate, and is parallel to the extension direction of the road.

11. The method according to claim 1, wherein the sending, to the target vehicle, the bypass path comprises:

sending, to the target vehicle, the bypass path before a distance between the target vehicle and a start point of the bypass path is less than a fifth distance threshold.

12. The method according to claim 1, wherein before the determining the initial driving path, the method further comprises:

determining the target parking space based on a parking space occupation status in the parking domain.

13. The method according to claim 1, wherein the method further comprises:

sending the bypass path to a mobile terminal associated with the target vehicle.

14. The method according to claim 1, wherein the sending, to the target vehicle, the initial driving path comprises:

sending, to the target vehicle, the initial driving path through a first communication link between a management cloud platform and the target vehicle; or in response to the first communication link is faulty, sending, to the target vehicle, the initial driving path through a second communication link between a lot server and the target vehicle; and the sending the bypass path to the target vehicle comprises:

sending, to the target vehicle, the bypass path through the first communication link between the management cloud platform and the target vehicle; or in response to the first communication link is faulty, sending, to the target vehicle, the bypass path through the second communication link between the lot server and the target vehicle.

15. An automated parking apparatus, comprising:

at least one processor; and a memory coupled to the at least one processor and storing programming instructions, which when executed by the at least one processor, cause the at least one processor to:

determine, in a parking domain based on a road traffic status in the parking domain, an initial location of a target vehicle, and a location of a target parking space of the target vehicle, an initial driving path from the initial location to the target parking space; and send, to the target vehicle, the initial driving path indicating the target vehicle to drive from the initial location to the target parking space;

if it is detected that there is an obstacle on the initial driving path:

determine an initial area occupied by the obstacle, wherein to determine the initial area, the processor is configured to at least one of:

determine, as the initial area, a rectangular area enclosed by sequentially connecting a first locating point, a second locating point, a third locating point, and a fourth locating point, wherein the first locating point and the second locating point are based on a first detection box corresponding to the obstacle, and the third locating point and the fourth locating point are based on a second detection box corresponding to the obstacle, wherein the first detection box is determined from a first image comprising the obstacle and the second detection box is determined from a second image comprising the obstacle; or determine, as the initial area, an area enclosed by sequentially connecting the first locating point, the second locating point, a fifth locating point, and a sixth locating point, wherein a distance between the first locating point and the fourth locating point is less than or equal to a fourth distance threshold, a distance between the second locating point and the third locating point is less than or equal to the fourth distance threshold, and the fifth location point and the sixth locating point are computed from the first locating point and the second locating point;

determine an obstacle area based on the initial area occupied by the obstacle and located within the obstacle area, wherein a distance between a target boundary of the obstacle area and a target boundary of the initial area is greater than or equal to a safe distance threshold, and wherein the obstacle area is obtained by extending the target boundary of the initial area based on the safe distance threshold;

determine a bypass path based on the obstacle area in which the obstacle is located in response to it is detected that there is an obstacle on the initial driving path, wherein the bypass path does not overlap the obstacle area and is located on a side that is of the target boundary of the obstacle area and that is away from the target boundary of the initial area;

send, to the target vehicle, the bypass path indicating the target vehicle to bypass the obstacle, and control the target vehicle to bypass the obstacle based on the bypass path.

16. The apparatus according to claim 15, wherein the at least one processor is further to:

separately determine a start point, an end point, and at least one intermediate point of the bypass path based on the obstacle area; wherein both the start point and the end point are located on the initial driving path, and both a shortest distance between the start point and the obstacle area and a shortest distance between the end point and the obstacle area are greater than or equal to a first distance threshold; and each intermediate point is located outside the initial driving path, a shortest distance between each intermediate point and the obstacle area is greater than or equal to a second distance threshold, and a shortest distance between each intermediate point and an edge of a road on which the obstacle is located is greater than or equal to a third distance threshold.

17. The apparatus according to claim 16, wherein the at least one intermediate point comprises a first intermediate point and a second intermediate point;

a connection line between the first intermediate point and a first vertex of the obstacle area is parallel to a width direction of the road, and a connection line between the second intermediate point and a second vertex of the obstacle area is parallel to the width direction of the road; and the first vertex is a vertex that is closest to the start point and that is in the obstacle area, and the second vertex is a vertex that is closest to the end point and that is in the obstacle area.

18. The apparatus according to claim 16, wherein the at least one processor is further to:

perform a filtering processing on a track formed by sequentially connecting the start point, the at least one intermediate point, and the end point, to obtain the bypass path.

19. A computer program product comprising computer-executable instructions stored on a non-transitory computer-readable storage medium that, when executed by a processor, cause an apparatus to:

determine, in a parking domain based on a road traffic status in the parking domain, an initial location of a target vehicle, and a location of a target parking space of the target vehicle, an initial driving path from the initial location to the target parking space;

send, to the target vehicle, the initial driving path indicating the target vehicle to drive from the initial location to the target parking space;

if it is detected that there is an obstacle on the initial driving path:

determine an initial area occupied by the obstacle, wherein to determine the initial area, the processor is configured to at least one of:

determine, as the initial area, a rectangular area enclosed by sequentially connecting a first locating point, a second locating point, a third locating point, and a fourth locating point, wherein the first locating point and the second locating point are based on a first detection box corresponding to the obstacle, and the third locating point and the fourth locating point are based on a second detection box corresponding to the obstacle, wherein the first detection box is determined from a first image comprising the obstacle and the second detection box is determined from a second image comprising the obstacle; or determine, as the initial area, an area enclosed by sequentially connecting the first locating point, the second locating point, a fifth locating point, and a sixth locating point, wherein a distance between the first locating point and the fourth locating point is less than or equal to a fourth distance threshold, a distance between the second locating point and the third locating point is less than or equal to the fourth distance threshold, and the fifth location point and the sixth locating point are computed from the first locating point and the second locating point;

determine an obstacle area based on the initial area occupied by the obstacle and located within the obstacle area, wherein a distance between a target boundary of the obstacle area and a target boundary of the initial area is greater than or equal to a safe distance threshold, and wherein the obstacle area is obtained by extending the target boundary of the initial area based on the safe distance threshold;

determine a bypass path based on the obstacle area in which the obstacle is located, wherein the bypass path does not overlap the obstacle area and is located on a side that is of the target boundary of the obstacle area and that is away from the target boundary of the initial area;

send, to the target vehicle, the bypass path indicating the target vehicle to bypass the obstacle, and control the target vehicle to bypass the obstacle based on the bypass path.

* * * * *